United States Patent
Lal

(10) Patent No.: US 12,425,348 B2
(45) Date of Patent: Sep. 23, 2025

(54) QUALITY-OF-SERVICE ENABLED NETWORK COMMUNICATION FOR VIRTUAL PRIVATE NETWORK CLIENTS

(71) Applicant: Adeia Guides Inc., San Jose, CA (US)

(72) Inventor: Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 20 days.

(21) Appl. No.: 18/238,278

(22) Filed: Aug. 25, 2023

(65) Prior Publication Data

US 2025/0071065 A1     Feb. 27, 2025

(51) Int. Cl.
| | | |
|---|---|---|
| G06F 15/173 | (2006.01) | |
| H04L 12/28 | (2006.01) | |
| H04L 12/46 | (2006.01) | |
| H04L 47/20 | (2022.01) | |
| H04L 47/2491 | (2022.01) | |

(52) U.S. Cl.
CPC ...... *H04L 47/2491* (2013.01); *H04L 12/2801* (2013.01); *H04L 12/4641* (2013.01); *H04L 47/20* (2013.01)

(58) Field of Classification Search
CPC .............. H04L 47/2491; H04L 12/2801; H04L 12/4641; H04L 47/20
See application file for complete search history.

(56) References Cited

U.S. PATENT DOCUMENTS

| | | | |
|---|---|---|---|
| 6,693,878 B1 * | 2/2004 | Daruwalla | H04L 63/0272 370/395.31 |
| 8,184,530 B1 * | 5/2012 | Swan | H04W 76/12 370/230 |
| 2005/0088977 A1 | 4/2005 | Roch et al. | |
| 2009/0225762 A1 | 9/2009 | Davidson et al. | |

(Continued)

FOREIGN PATENT DOCUMENTS

WO     2009109803 A1     9/2009

OTHER PUBLICATIONS

Blight, et al. "Policy-based networking architecture for QoS interworking in IP management-scalable architecture for large-scale enterprise-public interoperation," [URL: http://ieeexplore.ieee.org/ie15/6244/16698/00770724.pdf?isNumber=16698], 14 pp (1999).

(Continued)

*Primary Examiner* — Duyen M Doan
(74) *Attorney, Agent, or Firm* — Haley Guiliano LLP

(57) ABSTRACT

Systems and methods are provided herein for providing a system to reconfigure a user's access network to provide varying quality of service (QOS) based on flow identification. For example, a policy server (PS) may transmit a plurality of addresses of virtual private network (VPN) servers associated with a priority status to a cable modem (CM) and/or cable modem termination system (CMTS) associated with a client device. The CMTS may notify the PS when the CM and/or CMTS detects VPN traffic between the client device and a VPN server associated with the (Continued)

priority status. In response to the notification, the PS may transmit an update message to the CMTS, wherein the update message comprises an updated configuration. The updated configuration may be used to update the CM and/or CMTS so that the updated CM and/or CMTS process future data packets according to an updated QoS policy.

20 Claims, 13 Drawing Sheets

(56) References Cited

U.S. PATENT DOCUMENTS

| | | | |
|---|---|---|---|
| 2010/0290366 A1* | 11/2010 | Garcia | H04L 47/10 370/254 |
| 2011/0314086 A1 | 12/2011 | Finkelstein et al. | |
| 2015/0043350 A1* | 2/2015 | Basilier | H04L 63/0272 370/235 |
| 2018/0219958 A1 | 8/2018 | Bernstein et al. | |
| 2019/0225762 A1 | 7/2019 | Tsutsumi et al. | |
| 2021/0067414 A1* | 3/2021 | Costa | H04L 12/2854 |
| 2021/0234834 A1* | 7/2021 | Koshy | H04L 41/5025 |
| 2025/0008379 A1 | 1/2025 | Lal et al. | |

OTHER PUBLICATIONS

He, J., et al., "Managing enterprise VPN with PBN", Enterprise Networking, Applications and Services Conference Proceedings S, 83-88 (2011).
"Specification #: 23.501," [retrieved from URL: https://portal.3gpp.org/desktopmodules/Specifications/SpecificationDetails.aspx?specificationId=3144], 1 page.
"Using Virtual Private Network (VPN" for IoT," [retrieve from URL: https://iot.onesimcard.com/virtual-private-network-IoT/ on Oct. 25, 2023], 3 pages.
"5G Network Slicing," [retrieve from URL: https://www.viavisolutions.com/en-US/5g-network-slicing on Oct. 25, 2023], 9 pages.
"Differentiated services," WikipediA, [retrieved from URL: https://en.wikipedia.org/wiki/Differentiated_services on Oct. 25, 2023], 8 pages.
"How to trigger a network slice in a non-public network," [retrieved from URL: https://cumucore.com/blog/how-to-trigger-a-network-slice-in-a-non-public-network/ on Oct. 24, 2023], 8 pages.
"IPsec-VPNs-vs-SSl-VPNs," [retrieved from URL: https://www.cloudflare.com/learning/network-layer/ipsec-vs-ssl-vpn/ on Oct. 25, 2023], 5 pages.
"OpenSync. It's the only way," [retrieved from URL: https://www.opensync.io/ on Oct. 25, 2023], 8 pages.
"PacketCableSpecification-MultimediaSpecification-PKT-SP-MM-107-151111" , [retrieved from URL: https://community.cablelabs.com/wiki/plugins/servlet/cablelabs/alfresco/download?id=152f0820-cf0c-4a23-ada3-898746e490c2 on Oct. 25, 2023], 164 pages.
"SANOJA-IPsec-Tunnel-2021," [retrieved from URL: https://www.twingate.com/blog/ipsec-tunnel-mode/], 8 pages (2021).
"Using Virtual Private Network (VPN" for IoT," [retrieve from URL: https://iot.onesimcard.com/virtual-private-network-IoT/ on Oct. 25, 2023], 3 pages.
"Virtual Private Networking, Addressing and Routing for VPNs," [retrieved from URL: https://wwwdisc.chimica.unipd.it/luigino.feltre/pubblica/unix/winnt_doc/2000/inbe_vpn_tcsa.html on Oct. 17, 2023], 1-12 pages.
"What is 5QI in 5G," [retrieve from URL: https://www.5gworldpro.com/uncategorized/what-is-5qi-in-5g.html#:~: text=What%20is%20the%20meaning%20of,be%20standardized%20or%20non%2Dstandardized], 2 pages (2023).
"What is IP Sec—How IPSec VPNs work," [retrieved from URL: https://www.cloudflare.com/learning/network-layer/what-is-ipsec/#:~: text=IPsec%20is%20a%20group%20of,where%20the%20packets%20come%20from on Oct. 17, 2023], 7 pages.
"What is SLL VPN?," [retrieved from URL: https://www.fortinet.com/resources/cyberglossary/ssl-vpn on Oct. 25, 2023], pp. 1-5.
"Wi-Fi Certified Wmm Programs," [retrieved from URL: https://www.wi-fi.org/discover-wi-fi/wi-fi-certified-wmm-programs on Oct. 25, 2023], 3 pages.
Beijar, N., Serving up secure IoT with network slicing security, [retrieved from URL: https://www.ericsson.com/en/blog/2019/9/future-network-slicing-security-iot], 8 pages (2019).
Huang, et al., "Chapter 2: SLL VPN Technology," [retrieved from URL: https://www.networkworld.com/article/2268575/chapter-2--ssl-vpn-technology.html], 1-5 (2008).
Huang, Y-F., et al., "Research on QoS Classification of network Encrypted Traffic Behavior Based on Machine Learning," Electronics, 10(1376), 1-24 (2021).
Patel, M., "IPsec VPNs: What They Are and How to Set Them Up," [retrieved from URL: https://www.twingate.com/blog/ipsec-vpn], 1-12 (2021).
Riddel, J., "Chapter 14: Multimedia Applications," Network World, 1-2 (2007).

* cited by examiner

400

| Source IP 402 | Destination IP 404 | Protocol 406 | Source Port 408 | Destination Port 410 | IP Datagram 412 |

| Source IP 452 | Destination IP 454 | Protocol 456 | Source Port 458 | Destination Port 460 | IP Datagram 462 |

1202 Transmit a plurality of addresses of VPN servers associated with a priority status to one or more of a egress traffic handler or ingress traffic handler connected to a client device, wherein: the egress traffic handler processes egress packets from the client device according to a first egress policy; and the ingress traffic handler processes ingress packets to the client device according to a first ingress policy

1204 Receive from at least one of the egress traffic handler or ingress traffic handler, a notification, wherein the notification indicates occurrence of VPN traffic between the client device and a VPN server, wherein the address of the VPN server is one of the addresses of the plurality of addresses of VPN servers associated with the priority status

1206 Transmit an update message comprising an updated configuration for at least one of the egress traffic handler or ingress traffic handler to at least one of the egress traffic handler or ingress traffic handler, wherein the update message causes at least one of: the egress traffic handler to process future egress packets to the VPN server according to a second egress policy different than the first egress policy; or the ingress traffic handler to process future ingress packets from the VPN server according to a second ingress policy different than the first ingress policy

FIG. 12

QUALITY-OF-SERVICE ENABLED NETWORK COMMUNICATION FOR VIRTUAL PRIVATE NETWORK CLIENTS

BACKGROUND

The present disclosure relates to applying quality-of-service rules in a Virtual Private Network (VPN) environment and, in particular, using one or more factors to determine quality-of-service (QOS) rules for different access networks using a VPN.

SUMMARY

The increase in remote working has resulted in many users accessing sensitive data on networks remote from their workplace's secure networks. To protect sensitive data, many organizations offer VPN connectivity to members of the organization that work remotely. Due to the encryption process, performing work-related-activities using VPNs often require more networking resources than performing the same work-related-activities without using VPNs. Many users have had to upgrade their internet subscriptions to obtain adequate network conditions (e.g., sufficient bandwidth, reduced latency, etc.) to perform work-related-activities using a VPN. When a user pays for the upgraded internet subscription (which is often more expensive than their original internet subscription), internet service providers (ISPs) often update the user's access network to provide upgraded network conditions. For example, ISPs may install a new cable modem (CM) and/or reconfigure a cable modem termination system (CMTS) to provide increased bandwidth. However, many users only require the upgraded internet subscriptions for work-related-activities (e.g., video conferencing, emails, web-browsing, etc.), while their non-work-related activities remain relatively unchanged. Many users may prefer a cheaper internet subscription that provides higher QoS for work-related-activities and standard QoS for non-work-related-activities compared to a more expensive internet subscription that provides higher QoS for all activities. However, most ISPs lack the ability to dynamically update QoS based on the activities of the user.

Accordingly, techniques are disclosed herein for providing a system to reconfigure a user's access network to provide varying QoS based on flow identification. In some embodiments, a client device uses an internet subscription that provides dynamic QoS. For example, the client device may use an internet subscription that provides increased bandwidth allocation, decreased latency, and/or decreased jitter when the client device is performing work-related-activities. An Enterprise VPN QOS Adapter (EVQA) may be part of a policy server (PS) and may transmit a list of VPN servers associated with a priority status to a CM and/or a CMTS connected to the client device. The list of VPN servers may comprise a list of addresses (e.g., IP addresses) of VPN servers associated with work-related-activities.

A VPN connection may be established between the client device and a VPN server with a first address. During the VPN session, the CM may use the VPN connection to transmit egress packets received from the client device to the VPN server and the CMTS may use the VPN connection to receive ingress packets from the VPN server. The CM may process the egress packets according to a first egress policy and the CMTS may process the ingress packets according to a first ingress policy. The first egress policy and/or the first ingress policy may correspond to a first QoS. For example, the first egress policy and/or the first ingress policy may correspond to a first bandwidth allocation. In such an example, the CM and/or the CMTS may process the VPN packets according to the first bandwidth allocation.

In some embodiments, the CM and/or the CMTS determine that one or more packets being processed are associated with a VPN server identified in the list of VPN servers associated with the priority status. For example, the CM may determine that the destination address for an egress packet corresponds to an IP address included in the list of addresses of VPN servers associated with the priority status. In another example, the CMTS may determine that the source address for an ingress packet corresponds to an IP address included in the list of addresses of VPN servers associated with the priority status. The CM and/or CMTS may use the 5-tuple associated with one or more packets to make the determination that the one or more packets correspond to a VPN server associated with the priority status.

The CM and/or CMTS may then transmit a notification to the PS indicating the occurrence of VPN traffic between the client device and a VPN server associated with the priority status. The PS may transmit one or more updated configurations to the CM and/or the CMTS in response to receiving the notification indicating the occurrence of VPN traffic between the client device and a VPN server associated with the priority status. The one or more updated configurations may correspond to configurations providing updated QoS. For example, the PS may transmit a first updated configuration corresponding to an updated egress policy to the CM. The CM may be reconfigured according to the first updated configuration and then process future egress packets between the client device and the VPN server according to the updated egress policy. In another example, the PS may transmit a second updated configuration corresponding to an updated ingress policy to the CMTS. The CMTS may be reconfigured according to the second updated configuration and then process future ingress packets between the client device and the VPN server according to the updated ingress policy. Accordingly, the PS may update the configurations of the CM and/or the CMTS to provide an updated QoS for VPN traffic between the client device and the VPN server associated with the priority status. In some embodiments, the updated QoS is applied to all VPN traffic between the client device and the VPN server associated with the priority status.

In some embodiments, the PS transmits one or more updated configurations to the CM and/or the CMTS specifying different QoS for different traffic types. For example, the PS may transmit a first updated configuration to the CM. The first updated configuration may specific a first updated egress policy for a first traffic type and a second updated egress policy for a second traffic type. In some embodiments, the PS transmits one or more updated configurations to the CM and/or the CMTS via packet cable multimedia (PCMM). The CM may be reconfigured according to the first updated configuration to process future egress packets of the first traffic type according to the first updated egress policy and to process future egress packets of the second traffic type according to the second updated egress policy. After receiving the one or more updated configurations, the CM and/or the CMTS may detect traffic types identified by the one or more updated configurations using one or more methodologies. For example, the CM and/or the CMTS may use the 5-tuple of one or more packets of a first group of data packets to determine that the first group of data packets being transmitted over the VPN connection corresponds to a first traffic type. In another example, the CM and/or the CMTS may use one or more machine learning models (e.g., packet multilayer perceptron (P-MLP) model, majority voting model, etc.) to determine that the first group of data packets being transmitted over the VPN connection corresponds to the first traffic type. In another example, the CM and/or the CMTS may read the inner header (e.g., when an IPsec transport mode is being utilized) of one or more packets of the group of data packets being transmitted over the VPN connection between the client device and VPN server. The CM and/or the CMTS may then determine that the first group of data packets corresponds to the first traffic type based on the information in the inner header of the one or more data packets.

In some embodiments, the PS transmits one or more updated configurations to the CM and/or the CMTS specifying different QoS based on different subscriber information. For example, the PS may transmit a first updated configuration to the CM. The first updated configuration may specify a first updated egress policy for a first subscriber address (e.g., IP address of a home router) for a certain amount of time. The CM may be reconfigured according to the first updated configuration to process future egress packets from the first subscriber address according to the first updated egress policy during the indicated amount of time. Accordingly, the client device may receive a better QoS (e.g., bandwidth allocation) when working from home compared to a lesser QoS (e.g., bandwidth allocation) when working elsewhere (e.g., coffee shop).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 4A and 4B show illustrative diagrams of data packets used in a system for reconfiguring a user's access network to provide varying QoS, in accordance with some embodiments of the disclosure.

FIG. 12 is another illustrative flowchart of a process for reconfiguring a user's access network to provide varying QoS, in accordance with some embodiments of the disclosure.

DETAILED DESCRIPTION

Figure 1A:
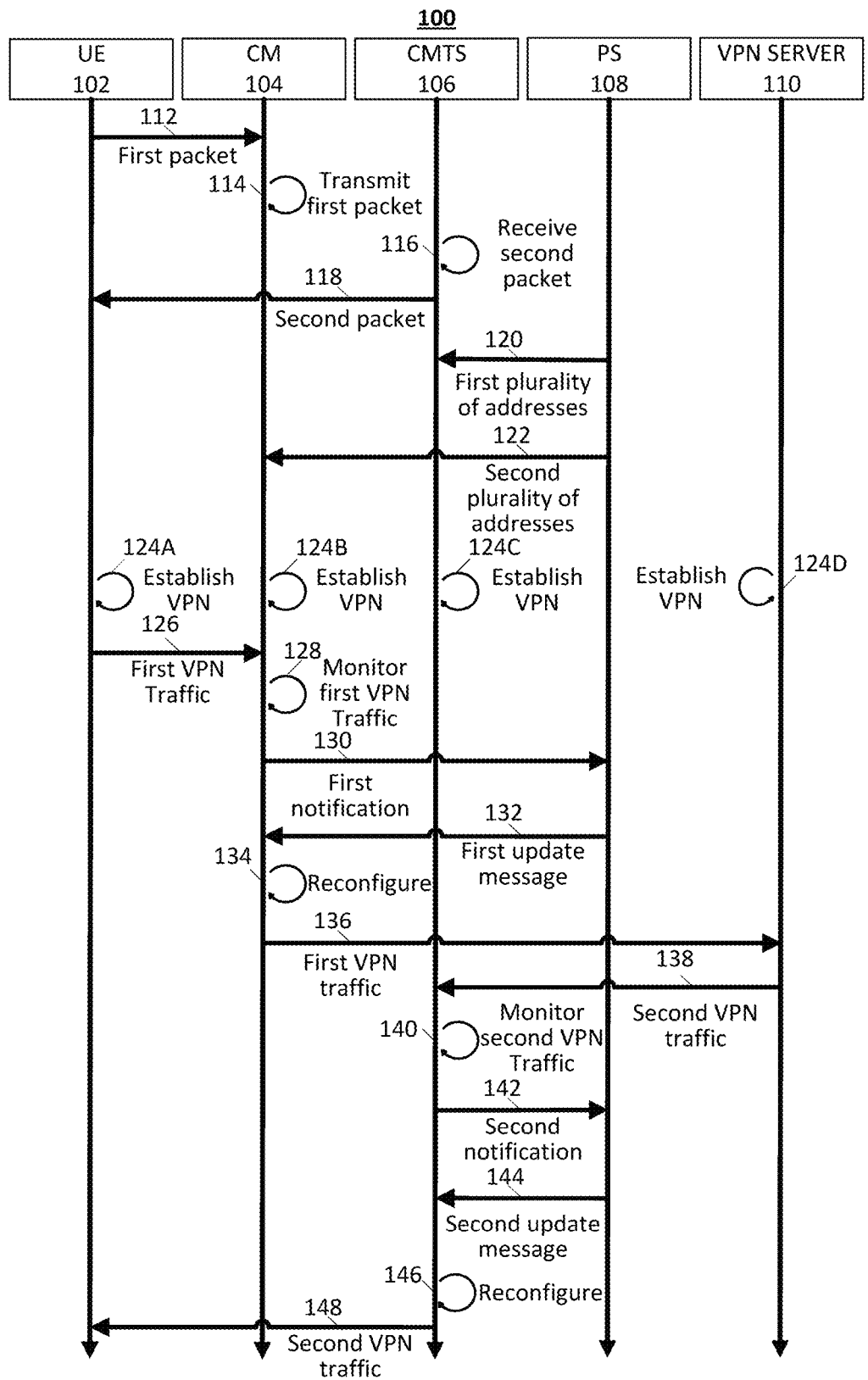
FIGS. 1A and 1B show illustrative flowcharts of processes for reconfiguring a user's access network to provide varying QoS, in accordance with some embodiments of the disclosure.

FIG. 1A shows an illustrative flowchart of a process 100 for reconfiguring a user's access network (e.g., access network over a hybrid fiber-coaxial cable network) to provide varying QoS, in accordance with some embodiments of the disclosure. In some embodiments, some steps of process 100 may be performed by one of several devices. Although a UE 102, a CM 104, a CMTS 106, a PS 108, and a VPN server 110 are shown any number of devices may be used. In some embodiments, one or more devices are combined. Although the process 100 is illustrated and described as a sequence of steps, it is contemplated that various embodiments of process 100 may be performed in any order or combination and need not include all the illustrated steps.

At step 112, UE 102 transmits a first data packet to CM 104. In some embodiments, the first data packet is one of a first plurality of data packets transmitted by UE 102. The first plurality of data packets may correspond to a first flow. In some embodiments, the first data packet is an uplink data packet with the same or similar format as the data packet (e.g., first data packet 402) displayed in FIG. 4A. At step 114, CM 104 transmits the first data packet received from UE 102. In some embodiments, the CM 104 transmits the first data packet using one or more devices. For example, the CM 104 may transmit the first data packet by transmitting the first data packet to the CMTS 106 that forwards the first data packet to the destination using one or more devices (e.g., network devices) and/or one or more communication links.

At step 116, CMTS 106 receives a second data packet. In some embodiments, CMTS 106 receives the second data packet from the same device that was the intended recipient of the first data packet. In some embodiments, the second data packet is one of a second plurality of data packets received by CMTS 106. The second plurality of data packets may correspond to a second flow. In some embodiments, the second data packet is a downlink data packet with the same or similar format as the data packet (e.g., second data packet 452) displayed in FIG. 4B. At step 118, CMTS 106 transmits the second data packet to UE 102. In some embodiments, the CMTS 106 transmits the second data packet to UE 102 using one or more devices. For example, the CMTS 106 may transmit the second data packet by transmitting the second data packet to the CM 104 that forwards the second data packet to the UE 102.

At step 120, PS 108 transmits a first plurality of addresses to CMTS 106. In some embodiments, the PS 108 transmits the first plurality of addresses to CMTS 106 using one or more devices. For example, PS 108 may transmit the first plurality of addresses to CMTS 106 over a communication network (e.g., communication network 608 displayed in FIG. 6). At step 122, PS 108 transmits a second plurality of addresses to CM 104. In some embodiments, the PS 108 transmits the second plurality of addresses to CM 104 using one or more devices. For example, PS 108 may transmit the second plurality of addresses to CM 104 using CMTS 106. In some embodiments, the first plurality of addresses and/or the second plurality of addresses corresponds to a plurality of VPN servers associated with a priority status. For example, the first plurality of address and/or the second plurality of addresses may comprise one or more IP addresses of VPN servers associated with work-related-activities. In some embodiments, the PS 108 comprises one or more Enterprise VPN QoS Adapters (EVQAs). In some embodiments, an EVQA is within a communication service provider domain and provides client devices, connected to an enterprise VPN, with varying connectivity using flow identification. In some embodiments, the EVQA applies QoS rules through the access network functions based on identified flow. The EVQA may be an extension of the policy engine and may store service-level agreement (SLA) rules and QoS mappings for enterprise VPNs.

At step 124A-124D, a VPN connection is established between UE 102 and VPN server 110. In some embodiments, VPN server 110 has a first address. At step 126, UE 102 transmits first VPN traffic to CM 104. In some embodiments, the first VPN traffic comprises one or more egress packets. In some embodiments, CM 104 transmits the first VPN traffic to VPN server 110 using the VPN connection established at step 124A-124D. CM 104 may process the first VPN traffic according to a first egress policy. In some embodiments, the first egress policy corresponds to a QoS parameter. For example, the first egress policy may correspond to a first bandwidth allocation based on an SLA provided by a network service provider to the user. In such an example, CM 104 may process the first VPN traffic according to the first bandwidth allocation.

At step 128, CM 104 monitors the first VPN traffic. In some embodiments, CM 104 determines that one or more packets of the first VPN traffic are associated with VPN server 110. The CM 104 may also determine that VPN server 110 is associated with the priority status. For example, CM 104 may determine that the destination address for an egress packet corresponds to an IP address included in the second plurality of addresses received at step 122. In some embodiments, CM 104 uses the 5-tuple associated with the one or more packets of the first VPN traffic to make the determination that the one or more packets correspond to one or more addresses included in the second plurality of addresses received at step 122. In some embodiments, one or more other devices monitor the first VPN traffic. For example, CM 104 may transmit information about the first VPN traffic to a second device which determines that VPN server 110 is associated with the priority status.

At step 130, CM 104 transmits a first notification to PS 108. In some embodiments, CM 104 transmits the first notification in response to determining that one or more packets of the first VPN traffic are associated with a VPN server (e.g., VPN server 110) associated with the priority status. CM 104 may transmit the first notification to PS 108 using one or more devices. For example, CM 104 may transmit the first notification to CMTS 106 which forwards the first notification to PS 108. At step 132, PS 108 transmits a first update message to CM 104. PS 108 may transmit the first update message to CM 104 using one or more devices. For example, PS 108 may transmit the first update message to CMTS 106 which forwards the first update message to CM 104. In some embodiments, the first update message comprises one or more updated configurations for CM 104. The one or more updated configurations may be associated with one or more updated egress policies. For example, a first updated configuration may be associated with a second egress policy corresponding to an updated QoS parameter (e.g., bandwidth allocation, latency allocation, etc.). In some embodiments, the one or more updated configurations indicate different QoS parameters for different traffic types. For example, the first updated configuration may specify a first QoS parameter for a first traffic type and a second QoS parameter for a second traffic type. In some embodiments, the one or more updated configurations indicate different QoS parameters for different subscriber information. For example, a first subscriber address may be a source IP address of a home router from which the VPN connection is established to a server with priority status (e.g., VPN server 110). A second subscriber address may be a source IP address from which no VPN connection is established, or a source IP address from which a VPN connection is established to a server that does not have a priority status. In such an example, the first updated configuration may specify a first QoS parameter for the first subscriber address and a second QoS parameter for the second subscriber addresses.

At step 134, CM 104 is reconfigured according to the received first update message. In some embodiments, CM 104 is reconfigured to process future egress packets according to the first update message. At step 136, CM 104 transmits first VPN traffic according to the received first update message. For example, the first update message may specify a first QoS parameter for a first traffic type and a second QoS parameter for a second traffic type. The CM 104 may detect that a first flow of the first VPN traffic is associated with the first traffic type. In response to detecting that the first flow is associated with the first traffic type, CM 104 may transmit one or more data packets of the first flow according to the first QoS parameter identified in the first update message. In some embodiments, CM 104 transmits the first VPN traffic to VPN server 110 using the VPN connection established at step 124A-124D and CM 104 transmits the first VPN traffic according to the first QoS parameter. In some embodiments, CM 104 uses one or more factors to identify flows of the first VPN traffic. For example, CM 104 may use the 5-tuple of one or more packets of a flow of the first VPN traffic to determine that the flow corresponds to a first traffic type. In another example, CM 104 may use one or more machine learning models (e.g., P-MPL model, majority voting model, etc.) to determine that one or more packets of a flow of the first VPN traffic correspond to a first traffic type. In another example, CM 104 may read the inner header (e.g., when an IPsec transport mode is being utilized) of one or more packets of a flow of the first VPN traffic to determine that the flow corresponds to a first traffic type.

At step 138, CMTS 106 receives second VPN traffic from VPN server 110. In some embodiments, the second VPN traffic comprises one or more ingress packets. In some embodiments, CMTS 106 receives the second VPN traffic from VPN server 110 using the VPN connection established at step 124A-124D. CMTS 104 may process the second VPN traffic according to a first ingress policy that may depend on an SLA agreement between the service provider and user. In some embodiments, the first ingress policy corresponds to a QoS parameter. For example, the first ingress policy may correspond to a second bandwidth allocation. In such an example, CMTS 106 may process the second VPN traffic according to the second bandwidth allocation.

At step 140, CMTS 106 monitors the second VPN traffic. In some embodiments, CMTS 106 determines that one or more packets of the second VPN traffic are associated with VPN server 110. The CMTS 106 may also determine that VPN server 110 is associated with the priority status. For example, CMTS 106 may determine that the source address for an ingress packet corresponds to an IP address included in the first plurality of addresses received at step 120. In some embodiments, CMTS 106 uses the 5-tuple associated with the one or more packets of the second VPN traffic to make the determination that the one or more packets correspond to one or more addresses included in the first plurality of addresses received at step 120. In some embodiments, one or more other devices monitor the second VPN traffic. For example, CMTS 106 may transmit information about the second VPN traffic to a second device which determines that the VPN server 110 is associated with the priority status.

At step 142, CMTS 106 transmits a second notification to PS 108. In some embodiments, CMTS 106 transmits the second notification in response to determining that one or more packets of the second VPN traffic are associated with a VPN server (e.g., VPN server 110) associated with the priority status. CMTS 106 may transmit the second notification to PS 108 using one or more devices. For example, CMTS 106 may transmit the second notification to one or more devices in a communication network, which forward the second notification to PS 108. At step 144, PS 108 transmits a second update message to CMTS 106. PS 108 may transmit the second updated message to CMTS 106 using one or more devices. For example, PS 108 may transmit the second update message to one or more devices in a communication network, which forward the second update message to CMTS 106. In some embodiments, the second update message comprises one or more updated configurations for CMTS 106. The one or more updated configurations may be associated with one or more updated ingress policies. For example, a second updated configuration may be associated with a second ingress policy corresponding to an updated QoS parameter (e.g., bandwidth allocation, latency allocation, etc.). In some embodiments, the one or more updated configurations indicate different QoS parameters for different traffic types. For example, the first updated configuration may specify a first QoS parameter for a first traffic type and a second QoS parameter for a second traffic type.

At step 146, CMTS 106 is reconfigured according to the received second update message. In some embodiments, CMTS 106 is reconfigured to process future ingress packets according to the second update message. At step 148, CMTS 106 transmits second VPN traffic according to the received second update message. For example, the second update message may specify a first QoS parameter for a first traffic type and a second QoS parameter for a second traffic type. CMTS 106 may detect that a first flow of the second VPN traffic is associated with the first traffic type. In response to detecting that the first flow is associated with the first traffic type, CMTS 106 may transmit one or more data packets of the first flow according to the first QoS parameter identified in the second update message. In some embodiments, CMTS 106 transmits the second VPN traffic to UE 102 using one or more devices and transmits the second VPN traffic according to the first QoS parameter. In some embodiments, CMTS 106 uses one or more factors to identify flows of the second VPN traffic. For example, CMTS 106 may use the 5-tuple of one or more packets of a flow of the second VPN traffic to determine that the flow corresponds to a first traffic type. In another example, CMTS 106 may use one or more machine learning models to determine that one or more packets of a flow of the second VPN traffic correspond to a first traffic type. In another example, CMTS 106 may read the inner header (e.g., when an IPsec transport mode is being utilized) of one or more packets of a flow of the second VPN traffic to determine that the flow corresponds to a first traffic type.

Figure 1B:
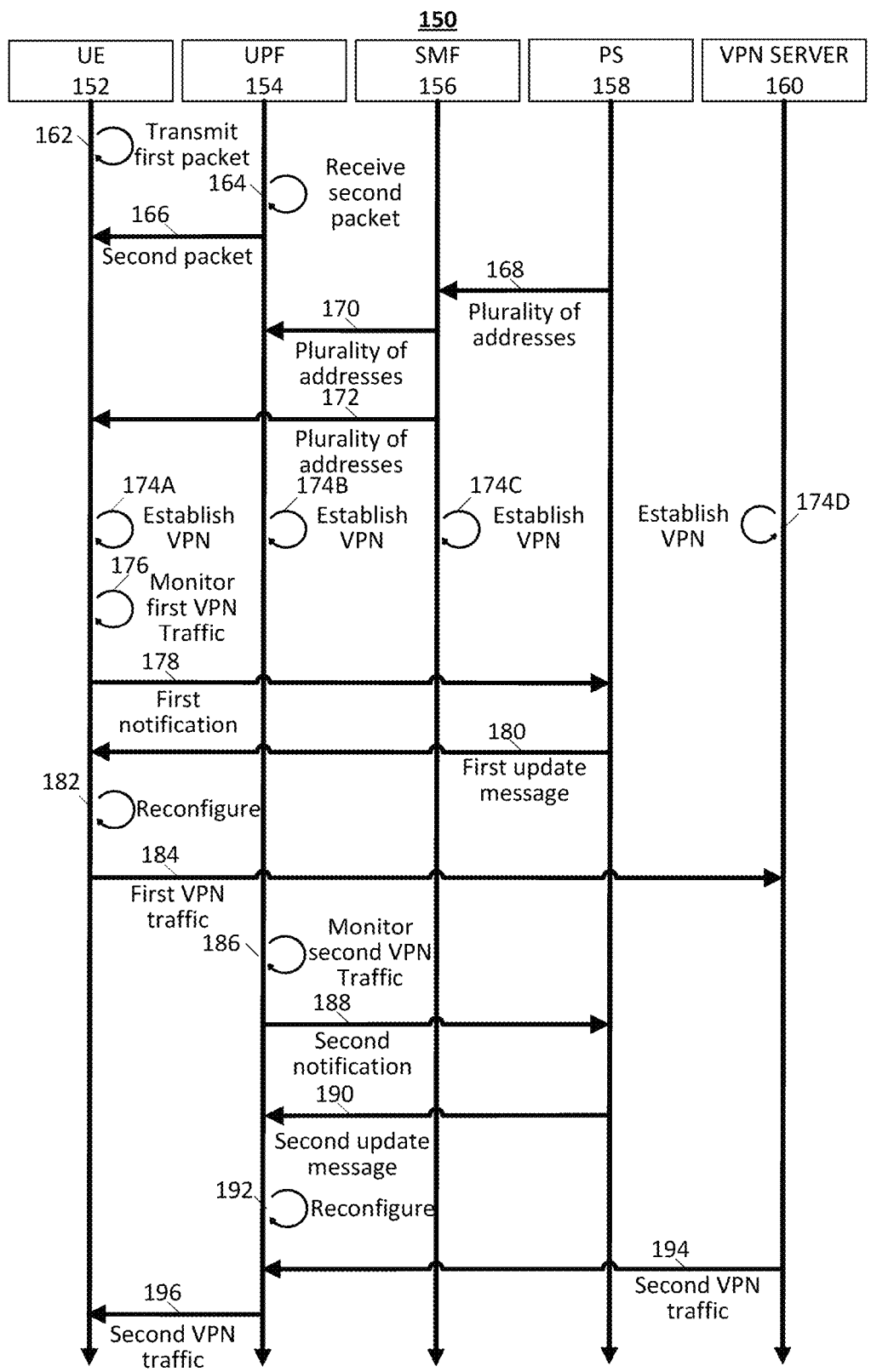

FIG. 1B shows an illustrative flowchart of a process 150 for reconfiguring a user's access network (e.g., radio access network in a cellular network) to provide varying QoS, in accordance with some embodiments of the disclosure. In some embodiments, some steps of process 150 may be performed by one of several devices. Although a UE 152, a user plane function (UPF) 154, a Session Management Function (SMF) 156, a PS 158, and a VPN server 160 are shown any number of components may be used. In some embodiments, one or more components are combined on a single device. In some embodiments, one or more components are distributed across multiple devices. Although the process 150 is illustrated and described as a sequence of steps, it is contemplated that various embodiments of process 150 may be performed in any order or combination and need not include all the illustrated steps.

At step 162, UE 152 transmits a first data packet. In some embodiments, the first data packet is one of a first plurality of data packets transmitted by UE 152. The first plurality of data packets may correspond to a first flow. In some embodiments, the first data packet is an uplink data packet with the same or similar format as the data packet (e.g., first data packet 402) displayed in FIG. 4A. In some embodiments, UE 152 transmits the first data packet using UPF 154. For example, UE 152 may transmit the first data packet to UPF 154 which forwards the first data packet to one or more devices in a communication network.

At step 164, UPF 154 receives a second data packet. In some embodiments, UPF 154 receives the second data packet from the same device that was the intended recipient of the first data packet. In some embodiments, the second data packet is one of a second plurality of data packets received by UPF 154. The second plurality of data packets may correspond to a second flow. In some embodiments, the second data packet is a downlink data packet with the same or similar format as the data packet (e.g., second data packet 452) displayed in FIG. 4B. At step 166, UPF 154 transmits the second data packet to UE 152. In some embodiments, UPF 154 transmits the second data packet to UE 102 using one or more devices. For example, UPF 154 may transmit the second data packet by transmitting the second data packet to a radio base station in a 5G network that forwards the second data packet to UE 152.

At step 168, PS 158 transmits a plurality of addresses to SMF 156. In some embodiments, the PS 108 comprises one or more EVQAs. In some embodiments, the plurality of addresses correspond to a plurality of VPN servers associated with a priority status. For example, the plurality of addresses may comprise a first IP address of a first VPN server (e.g., VPN server 160) associated with work-related-activities. In some embodiments, the PS 158 transmits the plurality of addresses to SMF 156 using one or more devices. For example, PS 158 may transmit the plurality of addresses to SMF 156 over a communication network (e.g., communication network 608 displayed in FIG. 6). At step 170, SMF 156 transmits the plurality of addresses to UPF 154. In some embodiments, SMF 156 transmits a first subset of the plurality of addresses received from PS 158 to UPF 154. In some embodiments, the SMF 156 transmits the plurality of addresses to UPF 154 using one or more devices. For example, SMF 156 may transmit the plurality of addresses to UPF 154 using one or more devices of a communications network. At step 172, SMF 156 transmits the plurality of addresses to UE 152. In some embodiments, SMF 156 transmits a second subset of the plurality of addresses received from PS 158 to UE 152. In some embodiments, the SMF 156 transmits the plurality of addresses to UE 152 using one or more devices. For example, SMF 156 may transmit the plurality of addresses to UE 152 using UPF 154.

At step 174A-174D, a VPN connection is established between UE 152 and VPN server 160. In some embodiments, VPN server 160 has a first address. At step 176, UE 152 monitors first VPN traffic. In some embodiments, the first VPN traffic comprises one or more egress packets. In some embodiments, UE 152 monitors the first VPN traffic that is transmitted from UE 152. For example, UE 152 may transmit the first VPN traffic to VPN server 160 using the VPN connection established at step 124A-124D. During transmission of one or more packets of the first VPN traffic, UE 152 may determine that one or more packets of the first VPN traffic are associated with VPN server 160. UE 152 may also determine that VPN server 160 is associated with the priority status. For example, UE 152 may determine that the destination address for an egress packet corresponds to an IP address included in the plurality of addresses received at step 172. In some embodiments, UE 152 uses the 5-tuple associated with the one or more packets of the first VPN traffic to make the determination that the one or more packets correspond to one or more addresses included in the plurality of addresses received at step 172. In some embodiments, one or more other devices monitor the first VPN traffic. For example, UE 152 may transmit information about the first VPN traffic to a second device that determines that the VPN server 160 is associated with the priority status. In some embodiments, UE 152 transmits one or more packets of the first VPN traffic according to a first egress policy. In some embodiments, the first egress policy corresponds to a QoS parameter. For example, the first egress policy may correspond to a first bandwidth allocation. In such an example, UE 152 may process the first VPN traffic according to the first bandwidth allocation.

At step 178, UE 152 transmits a first notification to PS 158. In some embodiments, UE 152 transmits the first notification in response to determining that one or more packets of the first VPN traffic are associated with a VPN server (e.g., VPN server 160) associated with the priority status. UE 152 may transmit the first notification to PS 158 using one or more devices. For example, UE 152 may transmit the first notification to UPF 154 which forwards the first notification to PS 158. At step 180, PS 158 transmits a first update message to UE 152. PS 158 may transmit the first updated message to UE 152 using one or more devices. For example, PS 158 may transmit the first update message to SMF 156 and/or UPF 154 which forwards the first update message to UE 152. In some embodiments, the first update message comprises one or more updated configurations for UE 152. The one or more updated configurations may be associated with one or more updated egress policies. For example, a first updated configuration may be associated with a second egress policy corresponding to an updated QoS parameter (e.g., bandwidth allocation, latency allocation, etc.). In some embodiments, the one or more updated configurations indicate different QoS parameters for different traffic types. For example, the first updated configuration may specify a first QoS parameter for a first traffic type and a second QoS parameter for a second traffic type. In some embodiments, the one or more updated configurations indicate different QoS parameters for different subscriber information.

At step 182, UE 152 is reconfigured according to the received first update message. In some embodiments, UE 152 is reconfigured to process future egress packets according to the first update message. At step 184, UE 152 transmits first VPN traffic according to the received first update message. For example, the first update message may specify a first QoS parameter for a first traffic type and a second QoS parameter for a second traffic type. UE 152 may detect that a first flow of the first VPN traffic is associated with the first traffic type. In response to detecting that the first flow is associated with the first traffic type, UE 152 may transmit one or more data packets of the first flow according to the first QoS parameter identified in the first update message. In some embodiments, UE 152 transmits the first VPN traffic to VPN server 160 using the VPN connection established at step 174A-174D and UE 152 transmits the first VPN traffic according to the first QoS parameter. In some embodiments, UE 152 uses one or more factors to identify flows of the first VPN traffic. For example, UE 152 may use the 5-tuple of one or more packets of a flow of the first VPN traffic to determine that the flow corresponds to a first traffic type. In another example, UE 152 may use one or more machine learning models to determine that one or more packets of a flow of the first VPN traffic correspond to a first traffic type. In another example, UE 152 may read the inner header (e.g., when an IPsec transport mode is being utilized) of one or more packets of a flow of the first VPN traffic to determine that the flow corresponds to a first traffic type.

At step 186, UPF 154 monitors second VPN traffic. In some embodiments, the second VPN traffic comprises one or more ingress packets. In some embodiments, UPF 154 monitors the second VPN traffic that is received from VPN server 160. For example, VPN server 160 may transmit the second VPN traffic to UE 152 using the VPN connection established at step 174A-174D. As UPF 154 receives one or more packets of the second VPN traffic, UPF 154 may determine that one or more packets of the second VPN traffic are associated with VPN server 160. UPF 154 may also determine that VPN server 160 is associated with the priority status. For example, UPF 154 may determine that the source address for an ingress packet corresponds to an IP address included in the plurality of addresses received at step 170. In some embodiments, UPF 154 uses the 5-tuple associated with the one or more packets of the second VPN traffic to make the determination that the one or more packets correspond to one or more addresses included in the plurality of addresses received at step 170. In some embodiments, one or more other devices monitor the second VPN traffic. For example, UPF 154 may transmit information about the second VPN traffic to a second device which determines that the VPN server 160 is associated with the priority status. In some embodiments, UPF 154 receives one or more packets of the second VPN traffic according to a first ingress policy. In some embodiments, the first ingress policy corresponds to a QoS parameter. For example, the first ingress policy may correspond to a first bandwidth allocation. In such an example, UPF 154 may process the second VPN traffic according to the first bandwidth allocation.

At step 188, UPF 154 transmits a second notification to PS 158. In some embodiments, UPF 154 transmits the second notification in response to determining that one or more packets of the second VPN traffic are associated with a VPN server (e.g., VPN server 160) associated with the priority status. UPF 154 may transmit the second notification to PS 158 using one or more devices. For example, UPF 154 may transmit the second notification to SMF 156 and/or one or more devices in a communication network, which forward the second notification to PS 158. At step 190, PS 158 transmits a second update message to UPF 154. PS 158 may transmit the second updated message to UPF 154 using one or more devices. For example, PS 158 may transmit the second update message to SMF 156 and/or one or more devices in a communication network, which forward the second update message to UPF 154. In some embodiments, the second update message comprises one or more updated configurations for UPF 154. The one or more updated configurations may be associated with one or more updated ingress policies. For example, a second updated configuration may be associated with a second ingress policy corresponding to an updated QoS parameter (e.g., bandwidth allocation, latency allocation, etc.). In some embodiments, the one or more updated configurations indicate different QoS parameters for different traffic types. For example, the first updated configuration may specify a first QoS parameter for a first traffic type and a second QoS parameter for a second traffic type. In some embodiments, the one or more updated configurations indicate different QoS parameters for different subscriber information.

At step 192, UPF 154 is reconfigured according to the received second update message. In some embodiments, UPF 154 is reconfigured to process future ingress packets according to the second update message. At step 194, UPF 154 transmits second VPN traffic according to the received second update message. For example, the second update message may specify a first QoS parameter for a first traffic type and a second QoS parameter for a second traffic type. The UPF 154 may detect that a first flow of the second VPN traffic is associated with the first traffic type. In response to detecting that the first flow is associated with the first traffic type, UPF 154 may transmit one or more data packets of the first flow according to the first QoS parameter identified in the second update message. In some embodiments, UPF 154 transmits the second VPN traffic to UE 152 using one or more devices (e.g., radio base station) and transmits the second VPN traffic according to the first QoS parameter. In some embodiments, UPF 154 uses one or more factors to identify flows of the second VPN traffic. For example, UPF 154 may use the 5-tuple of one or more packets of a flow of the second VPN traffic to determine that the flow corresponds to a first traffic type. In another example, UPF 154 may use one or more machine learning models to determine that one or more packets of a flow of the second VPN traffic correspond to a first traffic type. In another example, UPF 154 may read the inner header (e.g., when an IPsec transport mode is being utilized) of one or more packets of a flow of the second VPN traffic to determine that the flow corresponds to a first traffic type.

Figure 2:
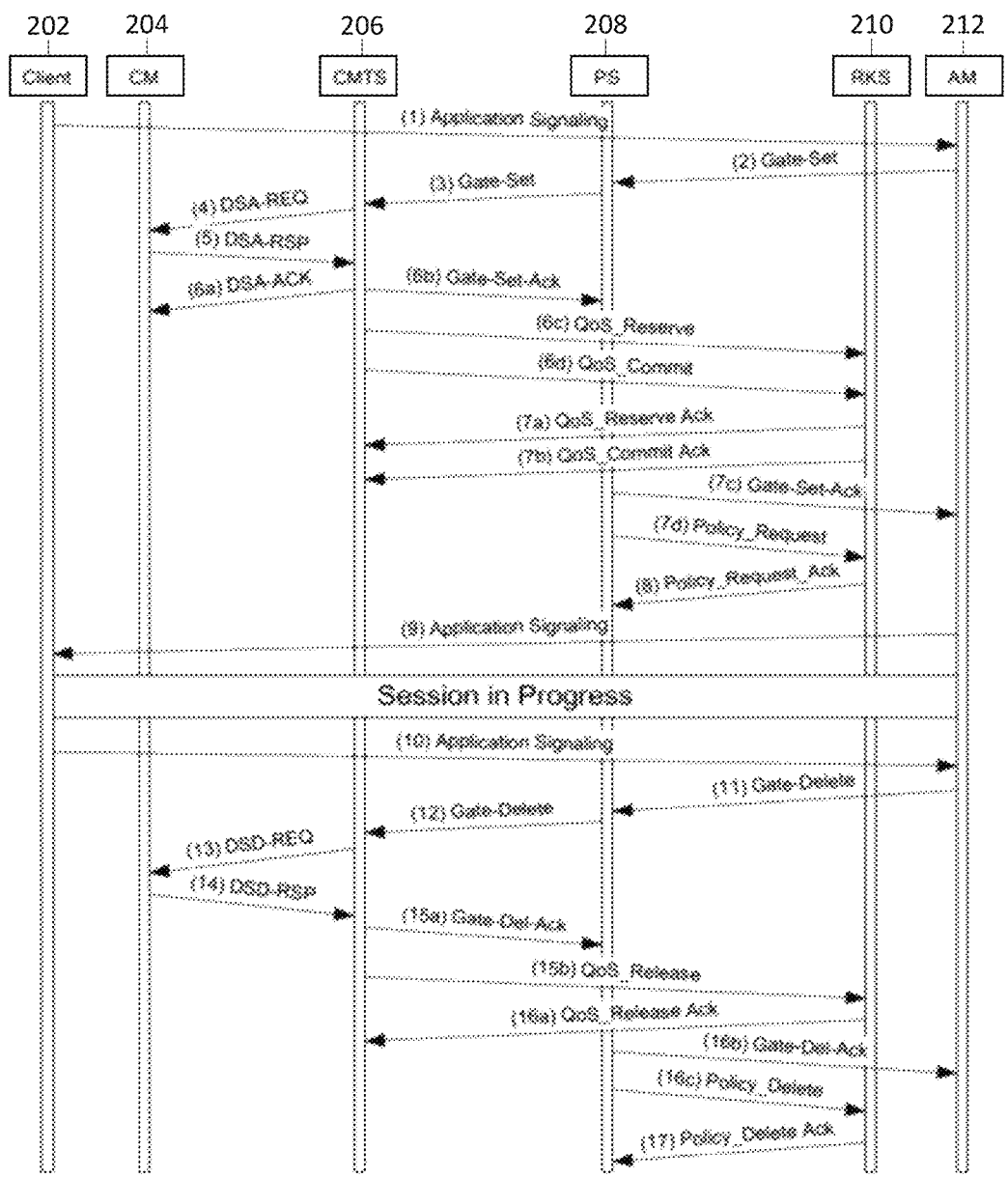
FIG. 2 shows an illustrative flowchart of a process for generating a session between a client device and an application manager, in accordance with some embodiments of the disclosure.

FIG. 2 shows an illustrative flowchart of a process 200 for generating a session between a client device and an application manager, in accordance with some embodiments of the disclosure. In some embodiments, the process 200 displays how QoS parameters are configured in a cable access network. In some embodiments, some steps of process 200 may be performed by one of several devices. Although a client 202, a CM 204, a CMTS 206, a PS 208, a record keeping server (RKS) 210, and an application manager (AM) 212 are shown any number of devices may be used. Although shown as separate devices, one or more of the devices may be combined. Although the process 200 is illustrated and described as a sequence of steps, it is contemplated that various embodiments of process 200 may be performed in any order or combination and need not include all the illustrated steps.

At step 1, the client 202 initializes a session by querying the AM 212 for the necessary resources to use an application (e.g., email, video conference, instant messaging, etc.). In some embodiments, the client 202 exchanges one or more messages with the AM 212, wherein the one or more messages indicate a request from the client 202 to create a new session. In some embodiments, the client 202 exchanges the one or more messages directly with the AM 212. In some embodiments, the client 202 exchanges the one or more messages with the AM 212 via one or more devices (e.g., application server). In some embodiments, the client 202 uses a protocol (e.g., Session Initiation Protocol (SIP), Hypertext Transfer Protocol (HTTP), etc.) to exchange the one or more messages with the AM 212. At step 2, the AM 212 transmits a first gate set message to the PS 208 requesting resources for the session. In some embodiments, the AM 212 transmits the first gate set message to the PS 208 after determining the required QoS parameters associated with the one or more messages received from the client 202. In some embodiments, the first gate set message identifies a subscriber. In some embodiments, the first gate set message also contains a classifier, a gate specification, and/or a traffic profile parameter required to achieve the determined QoS parameters.

At step 3, the PS 208 determines whether the AM 212 is authorized to request the indicated QoS parameters. In some embodiments, the PS 208 determines whether the AM 212 is authorized to request the indicated QoS parameters using one or more policies. For example, the PS 208 may have access to a database comprising one or more policies. The one or more policies may include limits on the number of gates allocated to a subscriber, limits on the types of QoS parameters available to a subscriber, limits on the types of applications that the PS 208 accepts, limits on the impact of service on a CMTS (e.g., CMTS 206), and/or similar such limits. If, based at least in part on one or more policies, the PS 208 determines that the request is authorized, then the PS 208 sends a second gate set message to the CMTS 206 associated with the client 202.

At step 4, the CMTS 206 initiates reserving and committing the access network resources by issuing a Dynamic Service Add (DSA) request to the CM 204. In some embodiments, the CMTS 206 initiates the reserving and committing in response to the CMTS 206 admission control succeeding. For example, the CMTS 206 may determine whether the PS 208 is authorized to request the indicated QoS parameters. In some embodiments, the CMTS 206 initiates the reserving and committing in response to determining whether the resources required for the indicated QoS parameters may be granted. In some embodiments, the CMTS 206 creates a gate, assigns a gate identifier, and converts the QoS parameters to Data Over Cable Service Interface Specification (DOCSIS) parameters. In some embodiments, the CMTS 206 indicates a service flow creation to the CM 204 for admission of the required resources if a reserved resource envelope is received. In some embodiments, the CMTS 206 also indicates the service flow creation/modification to the CM 204 relating to the activation of the required resources if a committed resource envelope is received.

At step 5, the CM 204 responds to the CMTS 206 with a DSA response. At step 6a, the CMTS 206 completes the transaction by transmitting a DSA acknowledgment to the CM 204. In some embodiments, the creation and modification of DOCSIS resources may be completed using one or more DOCSIS dynamic service flow messages. For example, a three-way handshake of a DSA request, DSA response, and DSA acknowledgment is used to create a DOCSIS service flow. In some embodiments, the three-way handshake of the DSA request, DSA response, and DSA acknowledgment is used to modify a DOCSIS service flow. In some embodiments, the gates and service flows are created, reserved, and committed all in the same step. At step 6b, the CMTS 206 transmits a first gate set acknowledgment to the PS 208. In some embodiments, the CMTS 206 transmits the gate set acknowledgment to the PS 208 in response to receiving the DSA response from the CM 204. In some embodiments, the CMTS 206 transmits the first gate set acknowledgment to the PS 208 if the service flow and gate creation process is successful. In some embodiments, the CMTS 206 transmits a gate set error message to the PS 208 if the gate creation process is unsuccessful. In some embodiments, the gate set error message indicates the reason for failure.

At step 6c, the CMTS 206 transmits a QoS reserve event message to the RKS 210, wherein the QoS reserve event message indicates that access network resources have been reserved. At step 6d, the CMTS 206 transmits a QoS commit event message to the RKS 210. In some embodiments, the CMTS 206 transmits the QoS commit event message to the RKS 210 immediately after sending the QoS reserve event message to the RKS 210 at step 6c. In some embodiments, the access network resources are reserved and committed in one step. At step 7a, the RKS 210 transmits a QoS reserve event message acknowledgment to the CMTS 206. At step 7a, the RKS 210 transmits a QoS commit event message acknowledgment to the CMTS 206. At step 7c, the PS 208 transmits a second gate set acknowledgement to the AM 212. In some embodiments, the PS 208 transmits the second gate set acknowledgement to the AM 212 in response to receiving the first gate set acknowledgement from the CMTS 206 at step 6b. At step 7d, the PS 208 transmits a policy request event message to the RKS 210. In some embodiments, the PS 208 transmits the policy request event message to the RKS 210 to track the policy request and associated outcome. At step 8, the RKS 210 transmits a policy request acknowledgment to the PS 208. At step 9, the AM 212 indicates that the client 202 is able to use the application. In some embodiments, the session between the client 202 and the AM 212 is established after step 9.

At step 10, the client 202 notifies the AM 212 that the client 202 is finished with the application. At step 11, the AM 212 transmits a first gate delete message to the PS 208. At step 12, the PS 208 transmits a second gate delete message to the CMTS 206. At step 13, the CMTS 206 transmits a Dynamic Service Delete (DSD) request to the CM 204. At step 14, the CM 204 transmits a DSD response to the CMTS 206. At step 15a, the CMTS 206 transmits a first gate delete acknowledgement to the PS 208. At step 15b, the CMTS 206 transmits a QoS release message to the RKS 210. In some embodiments, the QoS release event message indicates that the network resources that were previously reserved for the session between the client 202 and AM 212 are available. At step 16a, the RKS 210 transmits a QoS release event acknowledgement to the CMTS 206. In some embodiments, the RKS 210 transmits the QoS release event acknowledgement to the CMTS 206 after receiving and/or recording the QoS release event message. At step 16b, the PS 208 transmits a second gate delete acknowledgement to the AM 212. In some embodiments, the PS 208 transmits the second gate delete acknowledgement to the AM 212 in response to receiving the first gate delete acknowledgement from the CMTS 206. At step 16c, the PS 208 transmits a policy delete event message to the RKS 210. At step 17, the RKS 210 transmits a policy delete acknowledgement to the PS 208 ending the process 200.

Figure 3:
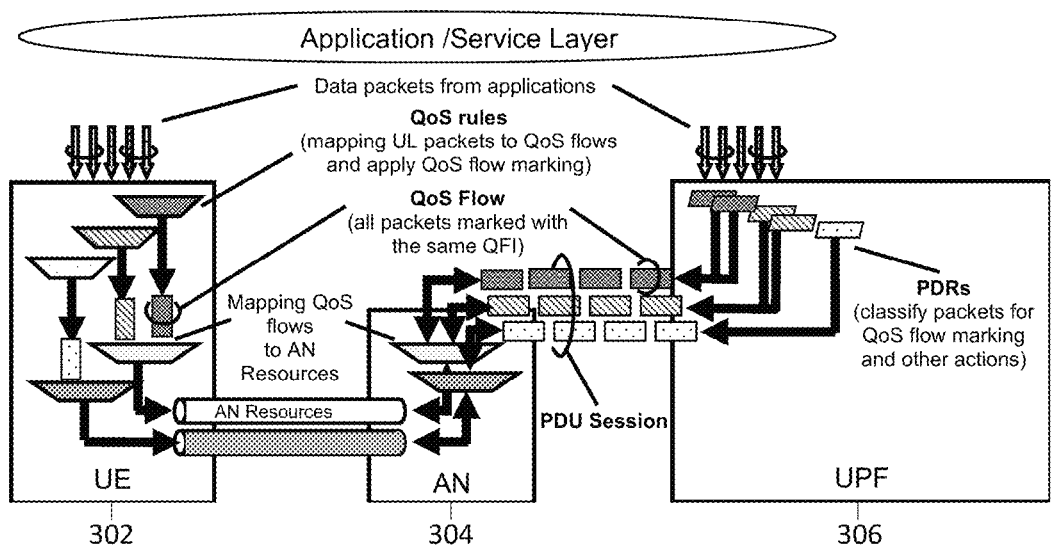
FIG. 3 shows an illustrative diagram of a system for mapping QoS flows to access networks in a mobile network, in accordance with some embodiments of the disclosure.

FIG. 3 shows an illustrative diagram of a system 300 for mapping QoS flows to access networks in a mobile network. In some embodiments, the system 300 comprises a UE 302, an access network (AN) 304, and a user plane function (UPF) 306. In some embodiments, the system 300 relates to a 5 g mobile network. The UPF 306 may apply Packet Detection Rules (PDRs) to a flow based on a policy received from a Session Management Function (SMF). In some embodiments, the SMF receives the PDRs from a Policy Charging Function (PCF). In some embodiments, the PCF is part of a policy engine. The UPF 306 may apply policies to one or more flows on the downlink based on the received PDRs. The UE 302 may apply polices to one or more flows on the uplink based on the received PDRs.

In some embodiments, in the downlink, incoming data packets are classified by the UPF 306 based on one or more Packet Filter Sets of the downlink PDRs in the order of their precedence. The UPF 306 may convey the classification of the User Plane traffic belonging to a QoS flow through an interface between a radio access network and the UPF 306. The AN 304 binds QoS flows to one or more AN resources (e.g., Data Radio Bearers). In some embodiments, the AN 304 determines the necessary AN resources that can be mapped to QoS flows. In some embodiments, the AN 304 also transmits one or more messages to ensure the necessary AN resources are available for the corresponding QoS flows. In some embodiments, the AN 304 also transmits one or more messages to the SMF to indicate that the necessary AN resources are available. In some embodiments, if no matching downlink PDR is identified, then the UPF 306 discards the corresponding download data packet.

In some embodiments, for a PDU Session of Type IP or Ethernet, the UE 302 evaluates uplink packets against uplink Packet Filters in a Packet Filter Set in the QoS rules based on the precedence value of QoS rules in increasing order until a matching QoS rule (i.e., whose Packet Filter matches the uplink packet) is found. In some embodiments, if no matching QoS rule is found, the UE 302 discards the uplink data packet.

FIGS. 4A and 4B show illustrative diagrams of data packets used in a system for reconfiguring a user's access network to provide varying QoS, in accordance with some embodiments of the disclosure. In some embodiments, the first data packet 400 and/or the second data packet 450 may be packets transmitted over an access network using IPsec after a VPN connection has been established between a UE device (e.g., UE 102, UE 152, etc.) and a VPN server (e.g., VPN server 110, VPN server 160, etc.). For example, the first data packet 400 may be an uplink data packet transmitted from the UE device (e.g., via a CM and/or CMTS) to the VPN server and the second data packet 450 may be a downlink data packet transmitted from the VPN server to the UE device (e.g., via a CM and/or CMTS).

In some embodiments, the first data packet 400 comprises a first source IP address 402, a first destination IP address 404, a first protocol 406, a first source port 408, a first destination port 410, and a first IP datagram 412. In some embodiments, the first source IP address 402 corresponds to an IP address leased to a home router from a service provider and the first destination IP address 404 corresponds to the IP address of a VPN server. In some embodiments, the second data packet 450 comprises a second source IP address 452, a second destination IP address 454, a second protocol 456, a second source port 458, a second destination port 460, and a second IP datagram 462. In some embodiments, the second source IP address 452 corresponds to the first destination IP address 404 and the second destination IP address 454 corresponds to first source IP address 402.

In some embodiments, one or more components of the first data packet 400 and/or the second data packet 450 are used to determine one or more flows. For example, a first plurality of data packets that share the same source IP address (e.g., first source IP address 402) may correspond to a first flow. In some embodiments, a flow is identified using one or more portions of a 5-tuple of a data packet. For example, the 5-tuple of the first data packet 400 may comprise the first source IP address 402, the first destination IP address 404, the first protocol 406, the first source port 408, and the first destination port 410. One or more flows may be identified using one or more values of the 5-tuple of the first data packet 400.

In some embodiments, different QoS parameters are applied to data packets based on the direction of the data packets (e.g., uplink vs downlink). For example, VPN traffic may be flowing between a UE device and a VPN server. The uplink data packets (e.g., first data packet 400) may comprise the first source IP address 402 and the downlink data packets (e.g., second data packet 450) may comprise the second source IP address 452). The access network may identify the uplink data packets as a first flow based on the uplink data packets comprising the first source IP address 402 and may identify the downlink data packets as a second flow based on the downlink data packets comprising the second source IP address 452. The access network may apply a first QoS parameter to the first flow and a second QoS parameter to the second flow resulting in different QoS parameters for the different directions of the data packets in the VPN traffic.

Figure 5:
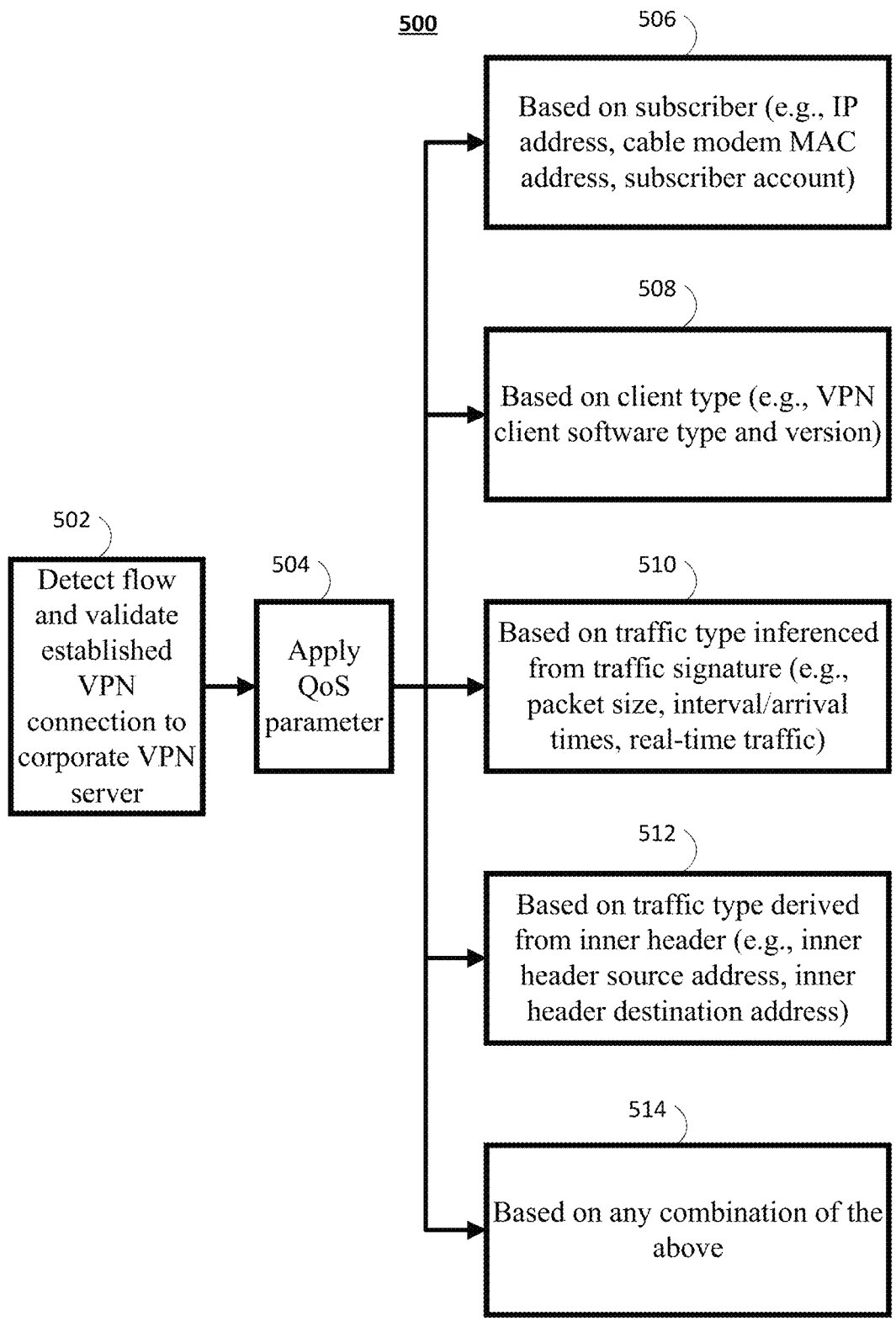
FIG. 5 shows an illustrative flowchart of a system for reconfiguring a user's access network to provide varying QoS, in accordance with some embodiments of the disclosure.

FIG. 5 shows an illustrative flowchart of a system 500 for reconfiguring a user's access network to provide varying QoS, in accordance with some embodiments of the disclosure. In some embodiments, the system 500 displays different criteria that are used for choosing one or more QoS parameters. In some embodiments, the system 500 detects a flow and validates an established VPN connection to a corporate VPN server at 502. The system 500 may validate that the established VPN connection is to a corporate VPN server using any of the methodologies described herein. For example, one or more devices may determine that one or more packets associated with a flow have a destination address corresponding to a corporate VPN server. In response to validating that the established VPN connection is to a corporate VPN server, the system 500 may apply one or more QoS parameters to the flow at 504.

In some embodiments, the system uses one or more criteria when determining a QoS to apply to a flow. For example, a first criteria 506 may correspond to subscriber information. In some embodiments, the subscriber information may correspond to an IP address (e.g., home router IP address) and/or MAC address (e.g., MAC address of a CM) associated with a client device. In some embodiments, a service provider maintains a database of addresses associated with a plurality of clients. In such embodiments, one or more devices may determine one or more addresses associated with a first flow and determine if the one or more addresses are included in the database. If the one or more addresses are included in the database, the one or more devices may apply a first policy to the flow. In some embodiments, the database also maps one or more policies to one or more clients. For example, the database may indicate a first policy for a first client. In such an example, the one or more devices may use the database to determine that a first policy may be applied to a first flow because the first flow corresponds to the first client. In some embodiments, one or more devices apply a first QoS policy to a client device when the client is working from their home (e.g., the flow is associated with the home router IP address) and apply a second QoS policy to the client device when the client is not working from their home (e.g., the flow is not associated with the home router IP address). In some embodiments, a second criteria 508 corresponds to a client type. In some embodiments, the client type corresponds to the VPN client software type and/or version.

In some embodiments, a third criteria 510 corresponds to a traffic type inferred from a traffic signature. In some embodiments, a traffic signature may correspond to one or more patterns associated with a flow. For example, a traffic signature may be associated with the size of one or more data packets of a flow, arrival time of one or more data packets of the flow, interval time between two or more data packets of the flow, and/or similar such characteristics. In some embodiments, the system 500 determines that a flow corresponds to a traffic type if one or more characteristics of the flow are the same or similar to one or more characteristics of a traffic type. In some embodiments, a flow may correspond to more than one traffic types. In some embodiments, the system 500 may use one or more characteristics to determine that the traffic signature is associated with real-time traffic. For example, the traffic signature for a first flow may correspond to a client device in a first location (e.g., home of a user) controlling a robotic arm at a second location (e.g., manufacturing center). In some embodiments, the system 500 uses one or more machine learning models (e.g., P-MPL model, majority voting model, etc.) to determine a traffic type associated with a flow.

In some embodiments, a fourth criteria 512 corresponds to a traffic type derived from inner header information. In some embodiments, the system 500 is only able to use the fourth criteria 512 when an IPsec transport mode is being utilized. The system 500 may use one or more pieces of inner header information to determine a traffic type. In some embodiments, a fifth criteria 514 corresponds to any combination of the other criteria described herein. For example, the system 500 may determine that a first QoS parameter should be applied to a first flow based on a first criteria 506 and a third criteria 510 associated with the first flow. The system 500 may determine that a second QoS parameter should be applied to a second flow based on a second criteria 508 associated with the second flow. In some embodiments, the first QoS parameter may correspond to a first bandwidth allocation, and the second QoS parameter may correspond to a second bandwidth allocation. In some embodiments, the second bandwidth allocation is less than the first bandwidth allocation.

Figure 6:
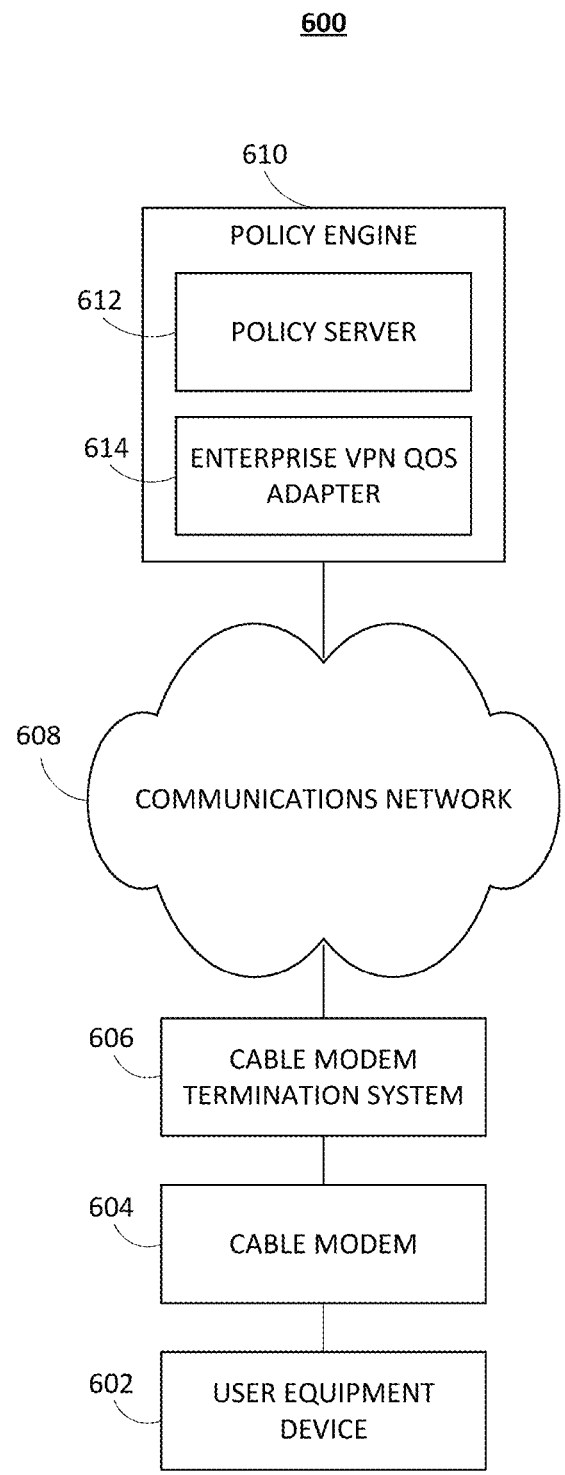
FIG. 6 shows an illustrative block diagram of a media system, in accordance with some embodiments of the disclosure.

FIGS. 6-9 describe exemplary devices, systems, servers, and related hardware for reconfiguring a user's access network to provide varying QoS, in accordance with some embodiments. In the system 600, there can be more than one user equipment device 602 but only one is shown in FIG. 6 to avoid overcomplicating the drawing. In addition, a user may utilize more than one type of user equipment device 602 and more than one of each type of user equipment device. In some embodiments, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 608.

The user equipment devices may be coupled to communications network 608 via the cable modem 604 and the cable modem termination system 606. In some embodiments, the communications network 608 may be one or more networks including the Internet, a mobile phone network, mobile voice or data network (e.g., a 4G, 5G, or LTE network), cable network, public switched telephone network, or other types of communications network or combinations of communications networks. The path between devices within the system 600 may separately or together with other paths include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communication with the user equipment device 602 may be provided by one or more communications paths but is shown as a single path in FIG. 6 to avoid overcomplicating the drawing.

In some embodiments, the user equipment device 602 accesses one or more servers via the cable modem 604 and the cable modem termination system 606. In some embodiments, the one or more servers may be coupled to any number of databases and may provide information to the user equipment device 602. For example, a first server may contain one or more pieces of computer-accessible source of content, such as media content, metadata, and/or similar such information. In some embodiments, the one or more servers store and/or execute various software modules for reconfiguring a user's access network to provide varying QoS functionality. In some embodiments, the system 600 may also include a policy engine 610 comprising a policy server 612 and/or an enterprise VPN QOS adapter 614. In some embodiments, the cable modem 604 and/or the cable modem termination system 606 communicate with the policy engine 610 via the communication network 608. Although the policy server 612 and the enterprise VPN QOS adapter 614 are shown as part of the policy engine 610 they may be located on different devices.

Figure 7:
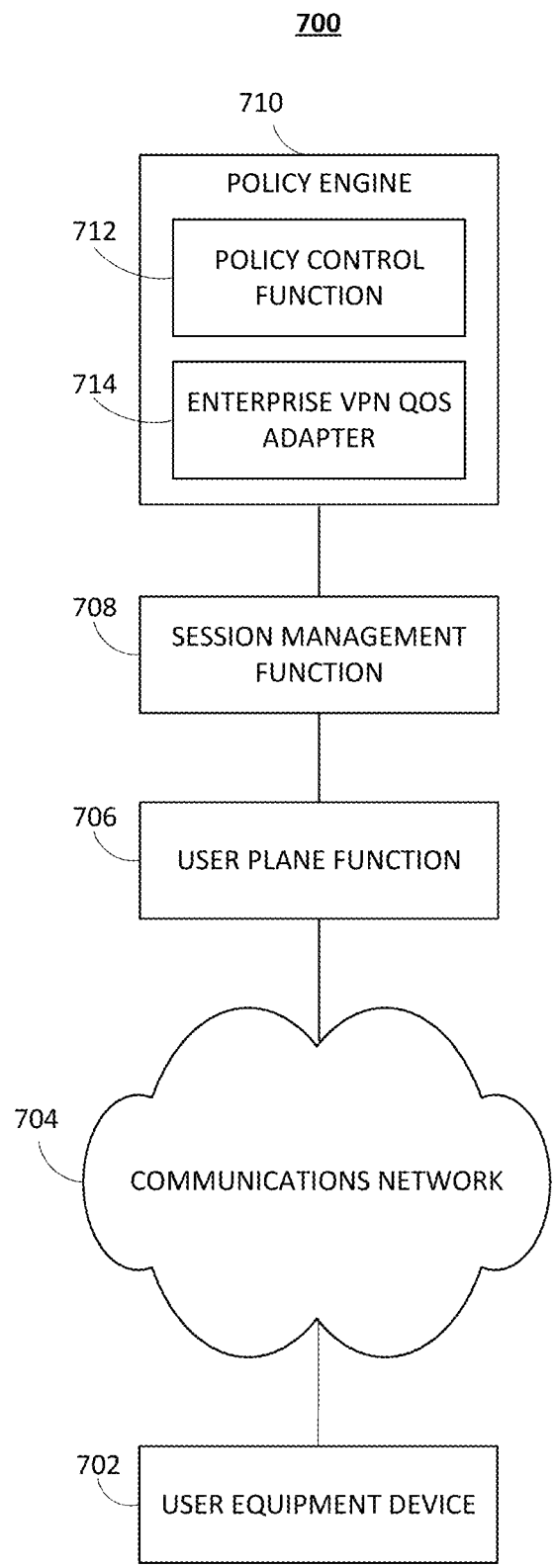
FIG. 7 shows an illustrative block diagram of another media system, in accordance with some embodiments of the disclosure.

FIG. 7 shows an illustrative block diagram of another media system for reconfiguring a user's access network to provide varying QoS. In the system 700, there can be more than one user equipment device 702 but only one is shown in FIG. 7 to avoid overcomplicating the drawing. In addition, a user may utilize more than one type of user equipment device 702 and more than one of each type of user equipment device. In some embodiments, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 704.

In some embodiments, the communications network 704 may be one or more networks including the Internet, a mobile phone network, mobile voice or data network (e.g., a 4G, 5G, or LTE network), cable network, public switched telephone network, or other types of communications network or combinations of communications networks. The path between devices within the system 700 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Communication with the user equipment device 702 may be provided by one or more communications paths but is shown as a single path in FIG. 7 to avoid overcomplicating the drawing.

In some embodiments, the user equipment device 702 accesses one or more servers via the user plane function 706 and/or the session management function 708. In some embodiments, the one or more servers may be coupled to any number of databases and may provide information to the user equipment device 702. For example, a first server may contain one or more pieces of computer-accessible sources of content, such as media content, metadata, and/or similar such information. In some embodiments, the one or more servers store and/or execute various software modules for reconfiguring a user's access network to provide varying QoS functionality. In some embodiments, the system 700 may also include a policy engine 710 comprising a policy control function 712 and/or an enterprise VPN QOS adapter 714. In some embodiments, the user plane function 706 and/or the session management function 708 communicate with the policy engine 710 via the communication network 704. Although the policy control function 712 and the enterprise VPN QOS adapter 714 are shown as part of the policy engine 710 they may be located on different devices.

Figure 8:
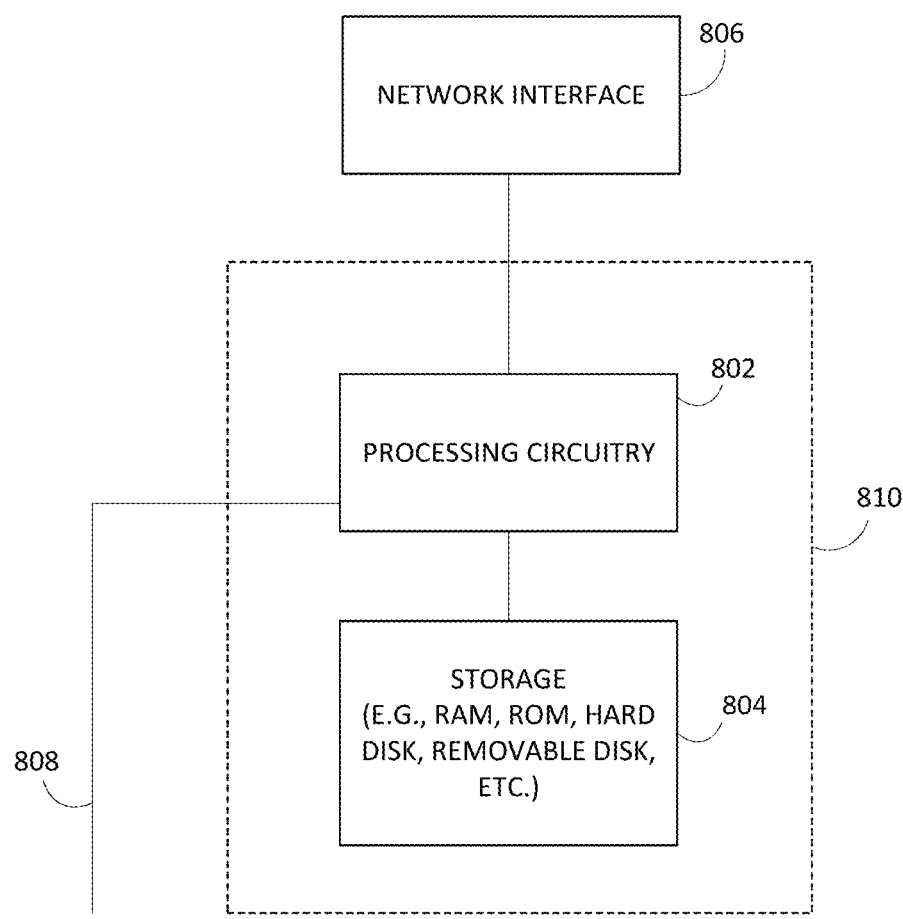
FIG. 8 shows an illustrative block diagram of a network device, in accordance with some embodiments of the disclosure.

FIG. 8 shows an illustrative block diagram of a network device 800, in accordance with some embodiments of the disclosure. In particular, network device 800 of FIG. 8 may be any of the devices depicted in FIGS. 1-4, 6, and/or 7 (e.g., CM 104, CMTS 106, PS 108, VPN server 110, etc.) or may be a physical or virtual device hosting any of physical or virtual devices. In some embodiments, network device 800 may be a router, an L3 switch, an L2 router, a host, and/or any other computing device that may be configured to participate in VPN switching or routing. Network device 800 may include one or more computer systems (e.g., computing devices), such as a desktop computer, a laptop computer, and a tablet computer. In some embodiments, the network device 800 is a data server that hosts one or more databases, models, or modules or may provide various executable applications or modules. In practice, and as recognized by those of ordinary skill in the art, items shown separately could be combined and some items could be separated. In some embodiments, not all shown items must be included in network device 800. In some embodiments, network device 800 may comprise additional items.

The network device 800 can include processing circuitry 802 that includes one or more processing units (processors or cores) that may communicate with storage 804, and/or a network interface 806 via input/output (I/O) paths 808. I/O paths 808 may use communication buses for interconnecting the described components. I/O paths 808 can include circuitry (sometimes called a chipset) that interconnects and controls communications between system components. Network device 800 may receive content and data via I/O paths

808. The I/O path 808 may provide data to control circuitry 810, which includes processing circuitry 802 and a storage 804. The control circuitry 810 may be used to send and receive commands, requests, and other suitable data using the I/O path 808. The I/O path 808 may connect the control circuitry 810 (and specifically the processing circuitry 802) to one or more communications paths. I/O functions may be provided by one or more of these communications paths but are shown as a single path in FIG. 8 to avoid overcomplicating the drawing.

The control circuitry 810 may be based on any suitable processing circuitry such as the processing circuitry 802. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as the storage 804 that is part of the control circuitry 810. Storage 804 may include random-access memory, read-only memory, high-speed random-access memory (e.g., DRAM, SRAM, DDR RAM, or other random-access solid-state memory devices), non-volatile memory, one or more magnetic disk storage devices, optical disk storage devices, flash memory devices, other non-volatile solid-state storage devices, solid state devices (SSDs), quantum storage devices, any other suitable fixed or removable storage devices, and/or any combination of the same.

In some embodiments, storage 804 or the computer-readable storage medium of the storage 804 stores an operating system, which includes procedures for handling various basic system services and for performing hardware dependent tasks. In some embodiments, storage 804 or the computer-readable storage medium of the storage 804 stores a communications module, which is used for connecting the network device 800 to other computers and devices via the one or more communication network interfaces 806 (wired or wireless), such as the internet, other wide area networks, local area networks, metropolitan area networks, and so on. In some embodiments, storage 804 or the computer-readable storage medium of the storage 804 stores a web browser (or other application capable of displaying web pages), which enables a user to communicate over a network with remote computers or devices.

In some embodiments, executable modules, applications, or sets of procedures may be stored in one or more of the previously mentioned memory devices and correspond to a set of instructions for performing a function described above. In some embodiments, modules or programs (i.e., sets of instructions) need not be implemented as separate software programs, procedures, or modules, and thus various subsets of modules may be combined or otherwise rearranged in various implementations. In some embodiments, the storage 804 stores a subset of the modules and data structures identified above. In some embodiments, the storage 804 may store additional modules or data structures not described above.

Figure 9:
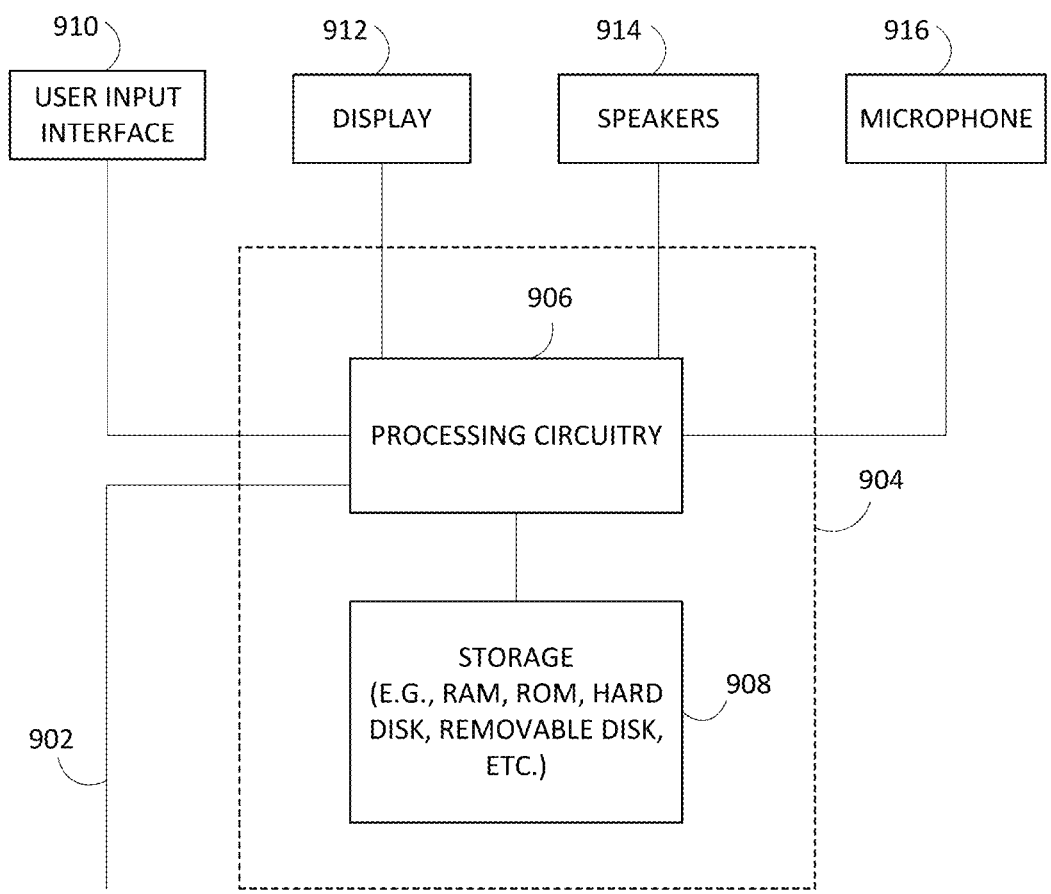
FIG. 9 shows an illustrative block diagram of a user equipment (UE) device system, in accordance with some embodiments of the disclosure.

FIG. 9 shows a generalized embodiment of a user equipment device 900, in accordance with some embodiments. In an embodiment, the user equipment device 900 is an example of the user equipment devices described in FIGS. 1-4, 6, and 7 (e.g., UE 102, UE 202, etc.). In some embodiments, the user equipment device 900 may receive content and data via I/O path 902. The I/O path 902 may provide content (e.g., video conferences, emails, instance messages, broadcast programming, on-demand programming, Internet content, content available over a local area network (LAN) or wide area network (WAN), and/or other content) and data to control circuitry 904, which includes processing circuitry 906 and a storage 908. The control circuitry 904 may be used to send and receive commands, requests, and other suitable data using the I/O path 902. The I/O path 902 may connect the control circuitry 904 (and specifically the processing circuitry 906) to one or more communications paths. I/O functions may be provided by one or more of these communications paths but are shown as a single path in FIG. 9 to avoid overcomplicating the drawing.

The control circuitry 904 may be based on any suitable processing circuitry such as the processing circuitry 906. As referred to herein, processing circuitry should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The reconfiguring of a user's access network to provide varying QoS functionality can be at least partially implemented using the control circuitry 904. The reconfiguring of a user's access network to provide varying QoS functionality described herein may be implemented in or supported by any suitable software, hardware, or combination thereof.

In client-server-based embodiments, the control circuitry 904 may include communications circuitry suitable for communicating with one or more servers that may at least implement the described reconfiguring of a user's access network to provide varying QoS functionality. The instructions for carrying out the above-mentioned functionality may be stored on the one or more servers. Communications circuitry may include a cable modem, an integrated service digital network ("ISDN") modem, a digital subscriber line ("DSL") modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 908 that is part of the control circuitry 904. As referred to herein, the phrase "electronic storage device" or "storage device" should be understood to mean any device for storing electronic data, computer software, or firmware, such as random-access memory, read-only memory, hard drives, optical drives, digital video disc ("DVD") recorders, compact disc ("CD") recorders, BLU-RAY disc ("BD") recorders, BLU-RAY 3D disc recorders, digital video recorders ("DVR", sometimes called a personal video recorder, or "PVR"), solid-state devices, quantum storage devices, gaming consoles, gaming media, or any other suitable fixed or removable storage devices, and/or any combination of the same. The storage 908 may be used to store various types of content described herein. Nonvolatile memory may also be used (e.g., to launch a boot-up routine and other instructions). Cloud-based storage may be used to supplement the storage 908 or instead of the storage 908.

The control circuitry 904 may include audio generating circuitry and tuning circuitry, such as one or more analog tuners, audio generation circuitry, filters or any other suitable tuning or audio circuits or combinations of such circuits. The control circuitry 904 may also include scaler circuitry for upconverting and down converting content into the preferred output format of the user equipment device 900. The control circuitry 904 may also include digital-to-analog converter circuitry and analog-to-digital converter circuitry for converting between digital and analog signals. The tuning and encoding circuitry may be used by the user equipment device 900 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 908 is provided as a separate device from the user equipment device 900, the tuning and encoding circuitry (including multiple tuners) may be associated with the storage 908.

The user may utter instructions to the control circuitry 904, which are received by the microphone 916. The microphone 916 may be any microphone (or microphones) capable of detecting human speech. The microphone 916 may be connected to the processing circuitry 906 to transmit detected voice commands and other speech thereto for processing. In some embodiments, voice assistants (e.g., Siri, Alexa, Google Home and similar such voice assistants) receive and process the voice commands and other speech.

The user equipment device 900 may optionally include an interface 910. The interface 910 may be any suitable user interface, such as a remote control, mouse, trackball, keypad, keyboard, touch screen, touchpad, stylus input, joystick, or other user input interfaces. A display 912 may be provided as a stand-alone device or integrated with other elements of the user equipment device 900. For example, the display 912 may be a touchscreen or touch-sensitive display. In such circumstances, the interface 910 may be integrated with or combined with the microphone 916. When the interface 910 is configured with a screen, such a screen may be one or more of a monitor, a television, a liquid crystal display ("LCD") for a mobile device, active matrix display, cathode ray tube display, light-emitting diode display, organic light-emitting diode display, quantum dot display, or any other suitable equipment for displaying visual images. In some embodiments, the interface 910 may be HDTV-capable. In some embodiments, the display 912 may be a 3D display. A speaker 914 may be controlled by the control circuitry 904. The speaker (or speakers) 914 may be provided as integrated with other elements of user equipment device 900 or may be a stand-alone unit. In some embodiments, the display 912 may be outputted through speaker 914.

Figure 10:
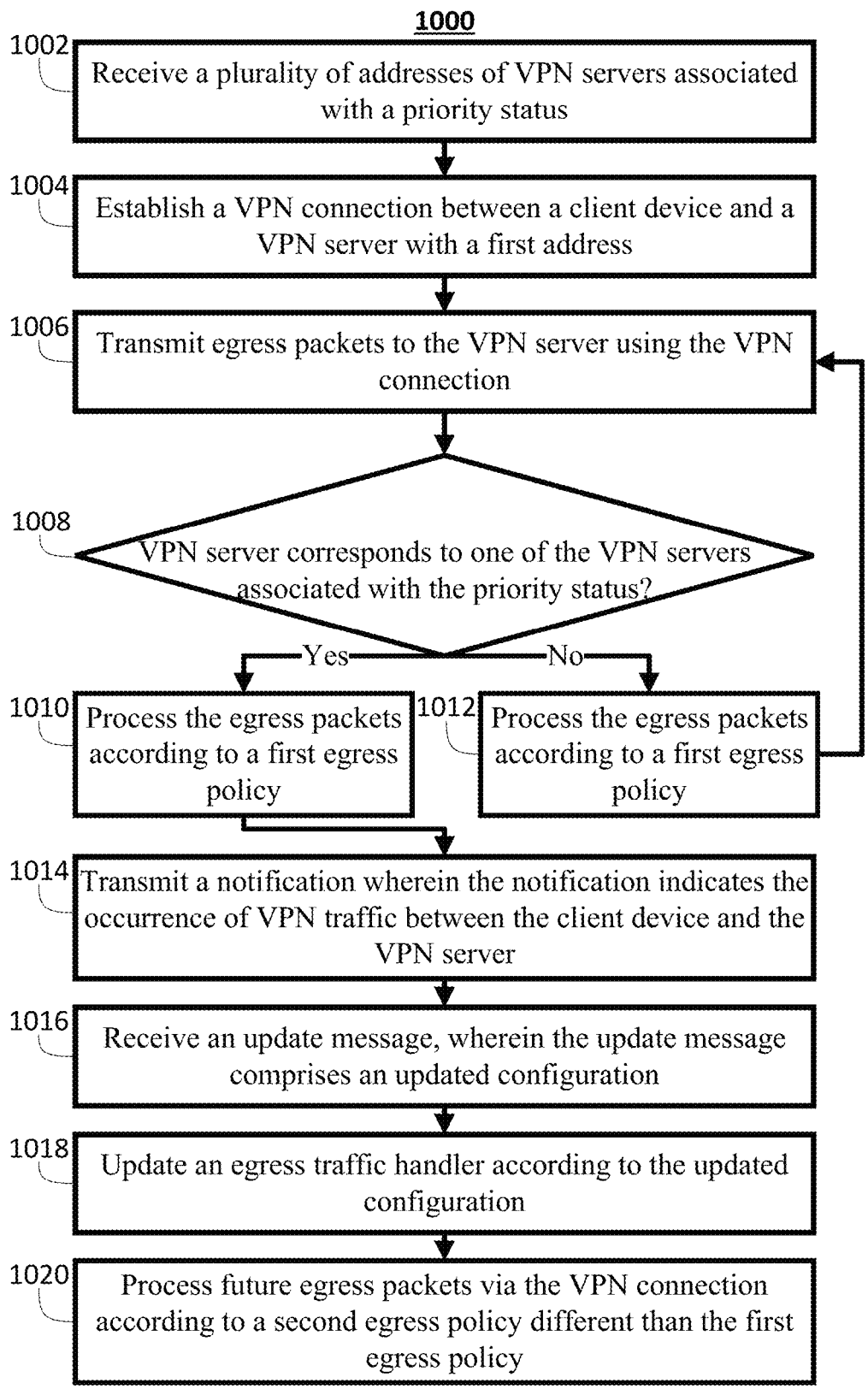
FIG. 10 is an illustrative flowchart of a process for reconfiguring a user's access network to provide varying QoS, in accordance with some embodiments of the disclosure.

FIG. 10 is an illustrative flowchart of a process 1000 for reconfiguring a user's access network to provide varying QoS, in accordance with some embodiments of the disclosure. Process 1000, and any of the following processes, may be executed by control circuitry 810 on a network device 800 and/or control circuitry 904 on a UE device 900. In some embodiments, control circuitry may be part of a remote server separated from the network device 800 and/or user equipment device 900 by way of a communications network or distributed over a combination of both. In some embodiments, instructions for executing process 1000 may be encoded onto a non-transitory storage medium (e.g., the storage 804, the storage 908) as a set of instructions to be decoded and executed by processing circuitry (e.g., the processing circuitry 802, the processing circuitry 906). Processing circuitry may, in turn, provide instructions to other sub-circuits contained within control circuitry, such as the encoding, decoding, encrypting, decrypting, scaling, analog/digital conversion circuitry, and the like. It should be noted that any of the processes, or any step thereof, could be performed on, or provided by, any of the devices described in FIGS. 1A-3 and 5-9. Although the processes are illustrated and described as a sequence of steps, it is contemplated that various embodiments of the processes may be performed in any order or combination and need not include all the illustrated steps.

At 1002, control circuitry receives a plurality of addresses of VPN servers associated with a priority status. In some embodiments, a PS (e.g., PS 610 displayed in FIG. 6) transmits the plurality of addresses to the control circuitry. In some embodiments, the PS transmits the plurality of addresses to the control circuitry using one or more devices. For example, the PS may transmit the plurality of addresses to the control circuitry using a communication network (e.g., communication network 608 displayed in FIG. 6) and/or a CMTS (e.g., CMTS 606 displayed in FIG. 6). In some embodiments, the plurality of addresses correspond to a plurality of VPN servers associated with a priority status. For example, the plurality of address may comprise one or more IP addresses of VPN servers associated with work-related-activities.

At 1004, control circuitry establishes a VPN connection between a client device and a VPN server with a first address. In some embodiments, the control circuitry is one of a plurality of devices that establishes the VPN connection. For example, the client device, VPN server, control circuitry, CMTS, network device, and/or similar such devices may establish and/or support the VPN connection between the client device and VPN server.

At 1006, control circuitry transmits egress packets to the VPN server using the VPN connection. In some embodiments, the control circuitry transmits egress packets to the VPN server using one or more egress traffic handlers. In some embodiments, the control circuitry and the one or more egress traffic handlers are located on a CM. In some embodiments, the control circuitry transmits the egress packets to the VPN server using the VPN connection established at step 1004. In some embodiments, control circuitry processes the egress packets according to a first egress policy.

At 1008, control circuitry determines whether the VPN server corresponds to one of the VPN servers associated with the priority status. In some embodiments, the control circuitry determines whether the VPN server associated with the egress packets corresponds to one of the VPN servers associated with the priority status by monitoring the egress packets. For example, the control circuitry may determine that the destination address for an egress packet corresponds to an IP address included in the plurality of addresses received at step 1002. In some embodiments, the control circuitry uses the 5-tuple associated with one or more packets of the egress packets to determine that the one or more packets correspond to one or more addresses included in the plurality of addresses received at step 1002. If the control circuitry determines that the VPN server associated with the egress packets does not correspond to one of the VPN servers associated with the priority status, the process 1000 continues to step 1012. If the control circuitry determines that the VPN server associated with the egress packets does correspond to one of the VPN servers associated with the priority status, the process 1000 continues to step 1010. In some embodiments, one or more other devices determines whether the VPN server corresponds to one of the VPN servers associated with the priority status. For example, the control circuitry may transmit information about the egress packets to a second device which determines whether the VPN server is associated with the priority status.

At 1010 and 1012, control circuitry processes the egress packets according to a first egress policy. In some embodiments, the first egress policy corresponds to a QoS parameter. For example, the first egress policy may correspond to a first bandwidth allocation. In such an example, the control circuitry may process the egress packets according to the first bandwidth allocation.

At 1014, control circuitry transmits a notification, wherein the notification indicates the occurrence of VPN traffic between the client device and the VPN server. In some embodiments, the control circuitry transmits the notification in response to determining that one or more egress packets are associated with a VPN server associated with the priority status. In some embodiments, the control circuitry transmits the notification to a PS. In some embodiments, the control circuitry transmits the notification to the PS using one or more devices. For example, the control circuitry may transmit the notification to a CMTS which forwards the notification to the PS.

At 1016, control circuitry receives an update message, wherein the update message comprises an updated configuration. In some embodiments, a PS transmits the update message. The PS may transmit the update message to the control circuitry using one or more devices. For example, the PS may transmit the update message to the control circuitry using a communication network and/or a CMTS. In some embodiments, the update message comprises one or more updated configurations for the control circuitry. The one or more updated configurations may be associated with one or more updated egress policies. For example, a first updated configuration may be associated with a second egress policy corresponding to an updated QoS parameter (e.g., bandwidth allocation, latency allocation, etc.). In some embodiments, the one or more updated configurations indicate different QoS parameters for different traffic types. For example, the first updated configuration may specify a first QoS parameter for a first traffic type and a second QoS parameter for a second traffic type. In some embodiments, the one or more updated configurations indicate different QoS parameters for different subscriber information. For example, the first updated configuration may specify a first QoS parameter for a first subscriber address (e.g., source IP address of a home router) and a second QoS parameter for other subscriber addresses (e.g., source IP addresses not associated with the home router).

At 1018, control circuitry updates an egress traffic handler according to the updated configuration. In some embodiments, the control circuitry and/or the egress traffic handler are part of a CM. In some embodiments, the egress traffic handler is reconfigured to process future egress packets according to the update message. At 1020, control circuitry processes future egress packets via the VPN connection according to a second egress policy different than the first egress policy. For example, the update message may specify a first QoS parameter for a first traffic type and a second QoS parameter for a second traffic type. The control circuitry may detect that a first flow of data packets is associated with the first traffic type. In response to detecting that the first flow of data packets is associated with the first traffic type, the control circuitry may transmit one or more data packets of the first flow according to the first QoS parameter identified in the update message. In some embodiments, the control circuitry uses one or more factors to identify flows of VPN traffic. For example, the control circuitry may use the 5-tuple of one or more egress packets of a flow of VPN traffic to determine that the flow corresponds to a first traffic type. In another example, the control circuitry may use one or more machine learning models (e.g., P-MPL model, majority voting model, etc.) to determine that one or more egress packets of a flow of VPN traffic corresponds to a first traffic type. In another example, the control circuitry may read the inner header (e.g., when an IPsec transport mode is being utilized) of one or more egress packets of a flow of VPN traffic to determine that the flow corresponds to a first traffic type.

Figure 11:
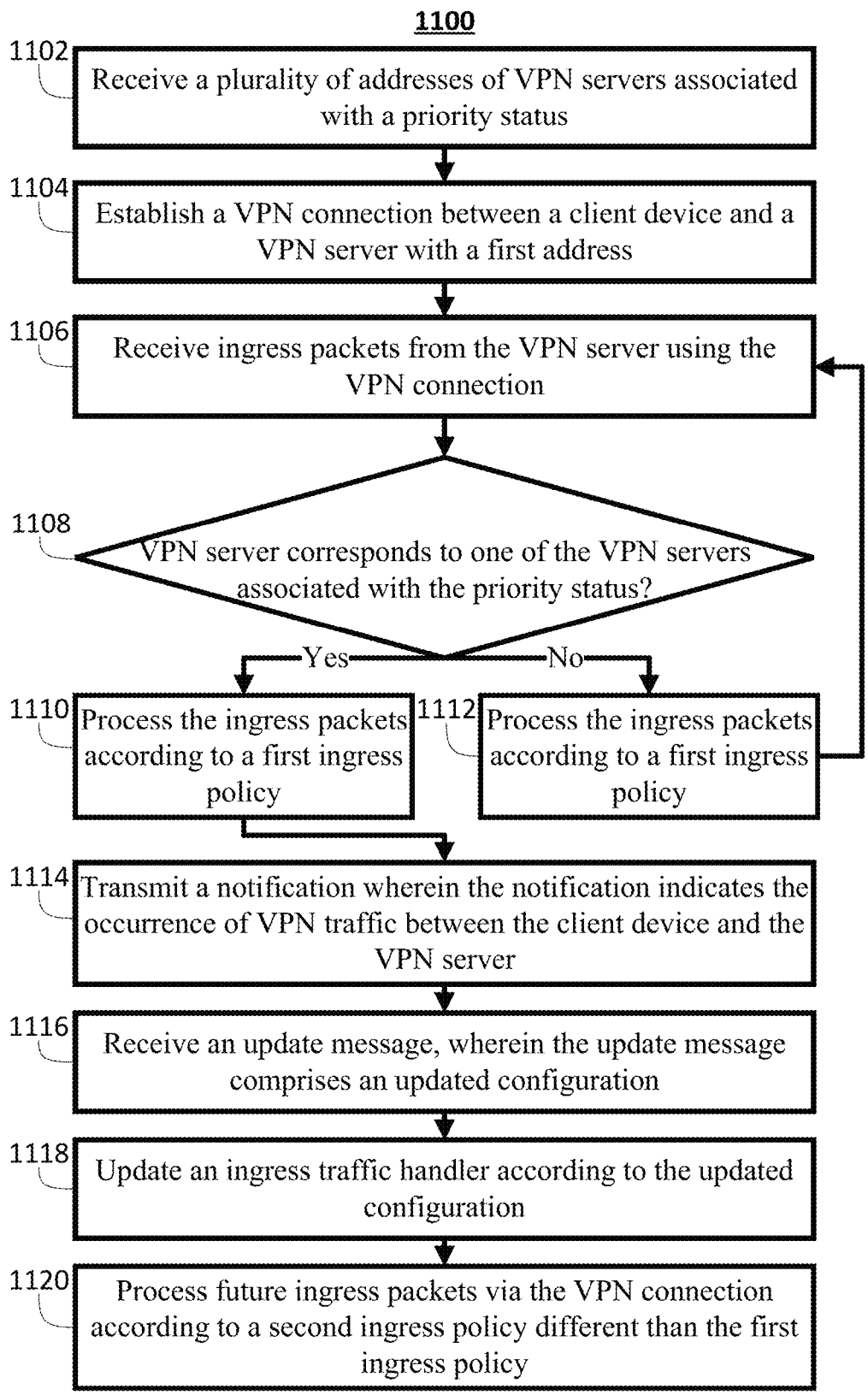
FIG. 11 is another illustrative flowchart of a process for reconfiguring a user's access network to provide varying QoS, in accordance with some embodiments of the disclosure.

FIG. 11 is another illustrative flowchart of a process 1100 for reconfiguring a user's access network to provide varying QoS, in accordance with some embodiments of the disclosure.

At 1102, control circuitry receives a plurality of addresses of VPN servers associated with a priority status. In some embodiments, a PS (e.g., PS 610 displayed in FIG. 6) transmits the plurality of addresses to the control circuitry. In some embodiments, the PS transmits the plurality of addresses to the control circuitry using one or more devices. For example, the PS may transmit the plurality of addresses to the control circuitry using a communication network (e.g., communication network 608 displayed in FIG. 6). In some embodiments, the plurality of addresses correspond to a plurality of VPN servers associated with a priority status. For example, the plurality of addresses may comprise one or more IP addresses of VPN servers associated with work-related-activities.

At 1104, control circuitry establishes a VPN connection between a client device and a VPN server with a first address. In some embodiments, the control circuitry is one of a plurality of devices that establishes the VPN connection. For example, the client device, VPN server, control circuitry, CM, network device, and/or similar such devices may establish and/or support the VPN connection between the client device and VPN server.

At 1106, control circuitry receives ingress packets from the VPN server using the VPN connection. In some embodiments, the control circuitry receives ingress packets from the VPN server using one or more ingress traffic handlers. In some embodiments, the control circuitry and the one or more ingress traffic handlers are located on a CMTS. In some embodiments, the control circuitry transmits the received ingress packets to the client device. In some embodiments, the control circuitry transmits the received ingress packets to the client device using one or more devices. For example, the control circuitry may transmit a first ingress packet to a CM, which then forwards the first ingress packet to the client device. In some embodiments, the control circuitry receives the ingress packets from the VPN server using the VPN connection established at step 1104. In some embodiments, control circuitry processes the ingress packets according to a first ingress policy.

At 1108, control circuitry determines whether the VPN server corresponds to one of the VPN servers associated with the priority status. In some embodiments, the control circuitry determines whether the VPN server associated with the ingress packets corresponds to one of the VPN servers associated with the priority status by monitoring the ingress packets. For example, the control circuitry may determine that the source address for an ingress packet corresponds to an IP address included in the plurality of addresses received at step 1102. In some embodiments, the control circuitry uses the 5-tuple associated with one or more packets of the ingress packets to determine that the one or more packets correspond to one or more addresses included in the plurality of addresses received at step 1102. If the control circuitry determines that the VPN server associated with the ingress packets does not correspond to one of the VPN servers associated with the priority status, the process 1100 continues to step 1112. If the control circuitry determines that the VPN server associated with the ingress packets does correspond to one of the VPN servers associated with the priority status, the process 1100 continues to step 1110. In some embodiments, one or more other devices determines whether the VPN server corresponds to one of the VPN servers associated with the priority status. For example, the control circuitry may transmit information about the ingress packets to a second device which determines whether the VPN server is associated with the priority status.

At 1110 and 1112, control circuitry processes the ingress packets according to a first ingress policy. In some embodiments, the first ingress policy corresponds to a QoS parameter. For example, the first ingress policy may correspond to a first bandwidth allocation. In such an example, the control circuitry may process the ingress packets according to the first bandwidth allocation.

At 1114, control circuitry transmits a notification, wherein the notification indicates the occurrence of VPN traffic between the client device and the VPN server. In some embodiments, the control circuitry transmits the notification in response to determining that one or more ingress packets are associated with a VPN server associated with the priority status. In some embodiments, the control circuitry transmits the notification to a PS. In some embodiments, the control circuitry transmits the notification to the PS using one or more devices. For example, the control circuitry may transmit the notification to one or more devices in a communication network that forwards the notification to the PS.

At 1116, control circuitry receives an update message, wherein the update message comprises an updated configuration. In some embodiments, a PS transmits the update message. The PS may transmit the update message to the control circuitry using one or more devices. For example, the PS may transmit the update message to the control circuitry using a communication network. In some embodiments, the update message comprises one or more updated configurations for the control circuitry. The one or more updated configurations may be associated with one or more updated ingress policies. For example, a first updated configuration may be associated with a second ingress policy corresponding to an updated QoS parameter (e.g., bandwidth allocation, latency allocation, etc.). In some embodiments, the one or more updated configurations indicate different QoS parameters for different traffic types. For example, the first updated configuration may specify a first QoS parameter for a first traffic type and a second QoS parameter for a second traffic type.

At 1118, control circuitry updates an ingress traffic handler according to the updated configuration. In some embodiments, the control circuitry and/or the ingress traffic handler are part of a CMTS. In some embodiments, the ingress traffic handler is reconfigured to process future ingress packets according to the update message. At 1120, control circuitry processes future ingress packets via the VPN connection according to a second ingress policy different than the first ingress policy. For example, the update message may specify a first QoS parameter for a first traffic type and a second QoS parameter for a second traffic type. The control circuitry may detect that a first flow of data packets is associated with the first traffic type. In response to detecting that the first flow of data packets is associated with the first traffic type, the control circuitry may receive (e.g., from a VPN server) and/or forward (e.g., to a CM and/or client device) one or more data packets of the first flow according to the first QoS parameter identified in the update message. In some embodiments, the control circuitry uses one or more factors to identify flows of VPN traffic. For example, the control circuitry may use the 5-tuple of one or more ingress packets of a flow of VPN traffic to determine that the flow corresponds to a first traffic type. In another example, the control circuitry may use one or more machine learning models (e.g., P-MPL model, majority voting model, etc.) to determine that one or more ingress packets of a flow of VPN traffic corresponds to a first traffic type. In another example, the control circuitry may read the inner header (e.g., when an IPsec transport mode is being utilized) of one or more ingress packets of a flow of VPN traffic to determine that the flow corresponds to a first traffic type.

FIG. 12 is another illustrative flowchart of a process 1200 for reconfiguring a user's access network to provide varying QoS, in accordance with some embodiments of the disclosure.

At 1202, control circuitry transmits a plurality of addresses of VPN servers associated with a priority status to one or more of an egress traffic handler or ingress traffic handler connected to a client device, wherein the egress traffic handler processes egress packets from the client device according to a first egress policy and the ingress traffic handler processes ingress packets to the client device according to a first ingress policy. In some embodiments, a CMTS comprises the ingress traffic handler, and a CM comprises the egress traffic handler. In some embodiments, the control circuitry is part of an EVQA and/or a policy engine (e.g., policy engine 710, EVQA 714, etc.). In some embodiments, the first egress policy and/or the first ingress policy correspond to one or more QoS parameters. For example, the first egress policy and/or the first ingress policy may correspond to a first bandwidth allocation, first latency allocation, and/or first jitter allocation.

At 1204, control circuitry receives from at least one of the egress traffic handler or ingress traffic handler, a notification, wherein the notification indicates occurrence of VPN traffic between the client device and a VPN server, wherein the address of the VPN server is one of the addresses of the plurality of addresses of VPN servers associated with the priority status identified at step 1202.

At 1206, control circuitry transmits an update message comprising an updated configuration for at least one of the egress traffic handler or ingress traffic handler to at least one of the egress traffic handler or ingress traffic handler, wherein the update message causes at least one of: the egress traffic handler to process future egress packets to the VPN server according to a second egress policy different than the first egress policy; or the ingress traffic handler to process future ingress packets from the VPN server according to a second ingress policy different than the first ingress policy. In some embodiments, the second egress policy and/or the second ingress policy correspond to one or more QoS parameters. For example, the second egress policy and/or the second ingress policy may correspond to a second bandwidth allocation, second latency allocation, and/or second jitter allocation. In some embodiments, the second egress policy and/or the second ingress policy correspond to similar QoS parameters as the first egress policy and/or the first ingress policy. In some embodiments, the one or more QoS parameters associated with the first egress policy and/or the first ingress policy are less than the QoS parameters associated with the second egress policy and/or the second ingress policy. For example, the first egress policy may correspond to a first bandwidth allocation that is less than a second bandwidth allocation associated with the second egress policy.

In some embodiments, the one or more updated configurations specify different QoS for different traffic types. For example, the control circuitry may transmit a first updated configuration to the egress traffic handler. The first updated configuration may specific a first updated egress policy for a first traffic type and a second updated egress policy for a second traffic type. The egress traffic handler may be reconfigured according to the first updated configuration to process future egress packets of the first traffic type according to the first updated egress policy and to process future egress packets of the second traffic type according to the second updated egress policy. After receiving the one or more updated configurations, the egress traffic handler and/or ingress traffic handler may detect traffic types identified by the one or more updated configurations using one or more methodologies. For example, the egress traffic handler and/or ingress traffic handler may use the 5-tuple of one or more packets of a first group of data packets to determine that the first group of data packets being transmitted over the VPN connection corresponds to a first traffic type. In another example, the egress traffic handler and/or ingress traffic handler may use one or more machine learning models (e.g., P-MPL model, majority voting model, etc.) to determine that the first group of data packets being transmitted over the VPN connection corresponds to the first traffic type. In another example, the egress traffic handler and/or ingress traffic handler may read the inner header of one or more packets of the group of data packets being transmitted over the VPN connection between the client device and VPN server. The egress traffic handler and/or ingress traffic handler may then determine that the first group of data packets corresponds to the first traffic type based on the information in the inner header of the one or more data packets.

In some embodiments, the one or more updated configurations specify different QoS based on different subscriber information. For example, the control circuitry may transmit a first updated configuration to the egress traffic handler. The first updated configuration may specific a first updated egress policy for a first subscriber address (e.g., IP address of a home router) and a second updated egress policy for other subscriber addresses (e.g., IP addresses not associated with the home router). The egress traffic handler may be reconfigured according to the first updated configuration to process future egress packets from the first subscriber address according to the first updated egress policy and to process future egress packets from other subscriber addresses according to the second updated egress policy. Accordingly, the client device may receive a better QoS (e.g., first updated egress policy) when working from home compared to a lesser QoS (e.g., second updated egress policy) when working elsewhere (e.g., coffee shop).

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   transmitting, by a policy server (PS), a plurality of addresses associated with a priority status, wherein:
      each address of the plurality of addresses corresponds to at least one virtual private network (VPN) server of a plurality of VPN servers; and
      the plurality of addresses are transmitted to one or more of a cable modem (CM) or cable modem termination system (CMTS) associated with a client device;
   establishing a VPN connection between the client device and a VPN server of the plurality of VPN servers with a first address;
   transmitting, by the client device, egress packets to the VPN server using the VPN connection and the CM, wherein the CM processes the egress packets according to a first egress policy;
   receiving, by the client device, ingress packets from the VPN server using the VPN connection and the CMTS, wherein the CMTS processes the ingress packets according to a first ingress policy;
   detecting, by at least one of the CM or CMTS, that the plurality of addresses of VPN servers comprises the first address of the VPN server associated with the priority status based on at least one of the egress packets or the ingress packets;
   transmitting, by the CMTS, a notification to the PS, wherein the notification indicates occurrence of VPN traffic between the client device and the VPN server, wherein the first address of the VPN server is one of the addresses of the plurality of addresses of VPN servers associated with the priority status;
   transmitting, by the PS, an update message to at least one of the CM or CMTS, wherein the update message comprises an updated configuration for at least one of the CM or CMTS;
   receiving, by at least one of the CM or CMTS, the update message from the PS; and
   updating at least one of the CM or CMTS according to the updated configuration, wherein the updated configuration causes at least one of:
      (a) the CM to process future egress packets via the VPN connection according to a second egress policy different than the first egress policy; or
      (b) the CMTS to process future ingress packets via the VPN connection according to a second ingress policy different than the first ingress policy.

2. The method of claim 1, wherein:
   the first egress policy and/or the first ingress policy correspond to a first bandwidth allocation and the second egress policy and/or the second ingress policy correspond to a second bandwidth allocation; and the first bandwidth allocation is less than the second bandwidth allocation.

3. The method of claim 1, wherein:
the first egress policy and/or the first ingress policy correspond to a first latency allocation and the second egress policy and/or the second ingress policy correspond to a second latency allocation; and
the first latency allocation is less than the second latency allocation.

4. The method of claim 1, wherein:
the first egress policy and/or the first ingress policy correspond to a first jitter allocation and the second egress policy and/or the second ingress policy correspond to a second jitter allocation; and
the first jitter allocation is less than the second jitter allocation.

5. The method of claim 1, further comprising:
determining, by at least one of the CM or CMTS, that a first group of data packets correspond to a first flow, wherein the second egress policy and/or the second ingress policy indicates a first quality of service (QOS) for the first flow; and
processing, by at least one of the CM or CMTS, the first group of data packets according to the first QoS.

6. The method of claim 5, further comprising:
determining, by at least one of the CM or CMTS, that a second group of data packets correspond to a second flow, wherein the second egress policy and/or the second ingress policy indicates a second QoS for the second flow; and
processing, by at least one of the CM or CMTS, the second group of data packets according to the second QoS.

7. The method of claim 5, wherein at least one of the CM or CMTS determines that the first group of data packets correspond to the first flow based on a 5-tuple associated with the first group of data packets.

8. The method of claim 1, further comprising:
determining, by at least one of the CM or CMTS, that a first group of data packets correspond to a first traffic type, wherein the second egress policy and/or the second ingress policy indicates a first quality of service (QOS) for the first traffic type; and
processing, by at least one of the CM or CMTS, the first group of data packets according to the first QoS.

9. The method of claim 8, further comprising:
determining, by at least one of the CM or CMTS, that a second group of data packets correspond to a second traffic type, wherein the second egress policy and/or the second ingress policy indicates a second QoS for the second traffic type; and
processing, by at least one of the CM or CMTS, the second group of data packets according to the second QoS.

10. The method of claim 8, wherein at least one of the CM or CMTS determines that the first group of data packets correspond to the first traffic type using machine-learning.

11. The method of claim 1, further comprising:
determining, by at least one of the CM or CMTS, that an inner head of a data packet corresponds to a first traffic type, wherein the second egress policy and/or the second ingress policy indicates a first quality of service (QOS) for the first traffic type; and
processing, by at least one of the CM or CMTS, the data packet according to the first QoS.

12. A method comprising:
transmitting, by an enterprise virtual private network (VPN) quality of service (Qos) adapter (EVQA), a plurality of addresses associated with a priority status to one or more of a cable modem (CM) or cable modem termination system (CMTS) associated with a client device, wherein:
each address of the plurality of addresses corresponds to at least one (VPN) server of a plurality of VPN servers;
the CM processes a plurality of egress packets from the client device according to a first egress policy; and
the CMTS processes a plurality of ingress packets to the client device according to a first ingress policy;
receiving, by the EVQA, from at least one of the CM or CMTS, a notification, wherein the notification indicates occurrence of VPN traffic between the client device and a VPN server of the plurality of VPN servers, wherein the address of the VPN server is one of the addresses of the plurality of addresses associated with the priority status; and
transmitting, by the EVQA, an update message comprising an updated configuration for at least one of the CM or CMTS to at least one of the CM or CMTS, wherein the update message causes at least one of:
the CM to process a plurality of future egress packets to the VPN server according to a second egress policy different than the first egress policy; or
the CMTS to process a plurality of future ingress packets from the VPN server according to a second ingress policy different than the first ingress policy.

13. The method of claim 12, wherein:
the first egress policy and/or the first ingress policy correspond to a first bandwidth allocation and the second egress policy and/or the second ingress policy correspond to a second bandwidth allocation; and
the first bandwidth allocation is less than the second bandwidth allocation.

14. The method of claim 12, wherein:
the first egress policy and/or the first ingress policy correspond to a first latency allocation and the second egress policy and/or the second ingress policy correspond to a second latency allocation; and
the first latency allocation is less than the second latency allocation.

15. The method of claim 12, wherein:
the first egress policy and/or the first ingress policy correspond to a first jitter allocation and the second egress policy and/or the second ingress policy correspond to a second jitter allocation; and
the first jitter allocation is less than the second jitter allocation.

16. The method of claim 12, wherein:
the second egress policy and/or the second ingress policy indicates a first QoS for a first flow; and
at least one of the CM or CMTS processes a first group of data packets associated with the first flow according to the first QoS.

17. The method of claim 16, wherein:
the second egress policy and/or the second ingress policy indicates a second QoS for a second flow; and
at least one of the CM or CMTS processes a second group of data packets associated with the second flow according to the second QoS.

18. The method of claim 16, wherein at least one of the CM or CMTS determines that the first group of data packets correspond to the first flow based on a 5-tuple associated with the first group of data packets.

19. The method of claim 12, wherein:
the second egress policy and/or the second ingress policy indicates a first QoS for a first traffic type; and
at least one of the CM or CMTS processes a first group of data packets according to the first QoS.

20. An apparatus comprising:
control circuitry; and
at least one memory including computer program code for one or more programs, the at least one memory and the computer program code configured to, with the control circuitry, cause the apparatus to perform at least the following:
  transmit a plurality of addresses associated with a priority status to one or more of a cable modem (CM) or cable modem termination system (CMTS) associated with a client device, wherein:
    each address of the plurality of addresses corresponds to at least one virtual private network (VPN) server of a plurality of VPN servers;
    the CM processes a plurality of egress packets from the client device according to a first egress policy; and
    the CMTS processes a plurality of ingress packets to the client device according to a first ingress policy;
  receive from at least one of the CM or CMTS, a notification, wherein the notification indicates occurrence of VPN traffic between the client device and a VPN server of the plurality of VPN servers, wherein the address of the VPN server is one of the addresses of the plurality of addresses associated with the priority status; and
  transmit an update message comprising an updated configuration for at least one of the CM or CMTS to at least one of the CM or CMTS, wherein the update message causes at least one of:
    the CM to process a plurality of future egress packets to the VPN server according to a second egress policy different than the first egress policy; or
    the CMTS to process a plurality of future ingress packets from the VPN server according to a second ingress policy different than the first ingress policy.

* * * * *